(12) United States Patent
Apostolides et al.

(10) Patent No.: US 12,311,824 B2
(45) Date of Patent: May 27, 2025

(54) VEHICLE BODY HAVING INTEGRATED FLUID TRANSFER SYSTEM

(71) Applicant: RPM INDUSTRIES, LLC, Washington, PA (US)

(72) Inventors: John K. Apostolides, Pittsburgh, PA (US); William E. Ryckman, Coal Center, PA (US)

(73) Assignee: RPM INDUSTRIES, LLC, Washington, PA (US)

( * ) Notice: Subject to any disclaimer, the term of this patent is extended or adjusted under 35 U.S.C. 154(b) by 248 days.

(21) Appl. No.: 17/816,510

(22) Filed: Aug. 1, 2022

(65) Prior Publication Data
US 2023/0031435 A1 Feb. 2, 2023

Related U.S. Application Data

(60) Provisional application No. 63/227,427, filed on Jul. 30, 2021.

(51) Int. Cl.
*B60P 3/22* (2006.01)
(52) U.S. Cl.
CPC ............ *B60P 3/228* (2013.01); *B60P 3/2225* (2013.01); *B60P 3/225* (2013.01); *B60P 3/2295* (2013.01)
(58) Field of Classification Search
CPC .......... B60P 3/2295; B60P 3/228; B60P 3/225
See application file for complete search history.

(56) References Cited

U.S. PATENT DOCUMENTS

| | | | |
|---|---|---|---|
| 6,073,666 A * | 6/2000 | Clark, II | F01M 11/0458 141/94 |
| 6,302,167 B1 | 10/2001 | Hollub | |
| 6,595,248 B1 | 7/2003 | Rome et al. | |
| 6,729,364 B2 * | 5/2004 | Few | F01M 11/04 137/884 |
| 2003/0132250 A1 | 7/2003 | Greene | |
| 2004/0094227 A1 * | 5/2004 | Few | F01M 11/04 141/98 |
| 2005/0022869 A1 * | 2/2005 | Beyer | F16K 24/04 137/202 |
| 2005/0199312 A1 * | 9/2005 | Wiens | G07F 13/025 141/94 |
| 2011/0127273 A1 | 6/2011 | Deane et al. | |

(Continued)

OTHER PUBLICATIONS

International Search Report and Written Opinion of the International Searching Authority for International Application No. PCT/US2022/074365 mailed Oct. 25, 2022.

*Primary Examiner* — Jason K Niesz
(74) *Attorney, Agent, or Firm* — K&L Gates LLP

(57) ABSTRACT

A vehicle body. The vehicle body comprises a fluid transfer system integrated within the vehicle body. The fluid transfer system comprises a fluid evacuation system comprising a first fluid storage container, a fluid refill system comprising a second fluid storage container, a sensing system coupled to the fluid evacuation system and the fluid refill system, and a control circuit coupled to the sensing system, the fluid evacuation system and the fluid refill system. The control circuit is configured to (1) determine an amount of a first fluid in the first fluid storage container based on a first signal from the sensing system, and (2) determine an amount of a second fluid in the second fluid storage container based on a second signal from the sensing system.

35 Claims, 20 Drawing Sheets

(56) References Cited

U.S. PATENT DOCUMENTS

| | | | |
|---|---|---|---|
| 2012/0267003 A1* | 10/2012 | Murphy | ............... B60T 17/222 |
| | | | 141/11 |
| 2014/0116572 A1* | 5/2014 | Flournoy | ............... F01M 11/04 |
| | | | 141/94 |
| 2016/0023640 A1* | 1/2016 | Casale | ............... F01M 11/0458 |
| | | | 141/94 |
| 2016/0236657 A1 | 8/2016 | Erwin et al. | |
| 2018/0209333 A1 | 7/2018 | Horriat | |
| 2019/0001954 A1 | 1/2019 | Ali et al. | |
| 2019/0003369 A1 | 1/2019 | Lake | |
| 2019/0186979 A1 | 6/2019 | Starinsky et al. | |
| 2020/0088075 A1 | 3/2020 | Horn et al. | |
| 2021/0253416 A1 | 8/2021 | Apostolides et al. | |

* cited by examiner

VEHICLE BODY HAVING INTEGRATED FLUID TRANSFER SYSTEM

CROSS-REFERENCE TO RELATED APPLICATIONS

This application claims the benefit under 35 U.S.C. § 119(e) of the earlier filing date of U.S. Provisional Patent Application No. 63/227,427 filed on Jul. 30, 2021, titled VEHICLE BODY HAVING INTEGRATED FLUID TRANSFER SYSTEM, the contents of which are hereby incorporated by reference in their entirety.

BACKGROUND

It is common to change the fluids of certain machines at locations which are remote from a service or repair shop. In such instances, a specialized vehicle commonly known as a lube truck can be utilized to provide mobile and remote servicing of the fluids of the machines. However, such lube trucks are relatively expensive and thus are not economically feasible for many service providers. Another option is to utilize the bed of a truck (e.g., a Ford F-0, a Ford F-350, a Ford F-450, etc.), or the bed of a covered trailer, an open trailer and the like to transport an assembly commonly known as a lube skid to a remote location to service the fluids of one or more machines. An example of such a lube skid is shown in FIG. 1. The lube skid includes a first hose which can be connected to the sump of the machine, a first pump for drawing fluid from the machine, and a first tank for holding the fluid drawn from the machine. The first hose typically includes an inline flow meter so that a person operating the lube skid has an idea of how much fluid has been drawn from the machine. The lube skid also includes a second tank for holding fluid that is to be used for refilling the machine, a second pump for drawing the fluid from the second tank, and a second hose for delivering the refill fluid to the machine. The second hose typically includes an inline flow meter so that a person operating the lube skid has an idea of how much refill fluid has been drawn from the second tank, and by extension, how much refill fluid has been added to the machine.

Due to the flow restrictions introduced by the flow meters of known lube skids, the rate of the evacuation of fluid from the machine is relatively slow and the rate of the refilling of new fluid to the machine is also relatively slow. Also, flow meters of such lube skids typically have to be calibrated to the viscosity of the fluid flowing through them to be accurate. Thus, when such flow meters are to be used for a plurality of fluids, a different calibration is needed for each different fluid to be used in order for the flow meter to be accurate. Additionally, with many known lube skids, it is impossible to accurately know at a given point in time precisely how much fluid drawn from the machine can still be added to the first tank or how much fluid is left in the second tank for refilling the machine. Thus, it is difficult to know for sure whether all of the evacuations and refills scheduled for a given jobsite can be safely completed during the same visit, or even whether a complete evacuation and refill can be safely completed for a given machine. Additionally, if the operator is not paying attention, it is very possible to overfill the first tank, thereby creating an overflow event which can cause damage to the environment. Furthermore, known lube skids are essentially dumb devices in the sense that they have no means for acquiring, storing or processing data associated with the evacuation and refill process, and cannot communicate with or be integrated with an inventory management system or a work order system.

Additionally, a concern associated with such lube skids involves the amount of physical space the lube skids occupy in the truck bed, in the covered trailer, on the bed of the open trailer, etc. Many service providers wish to carry a relatively large number of tools, parts and or other equipment with them when traveling to a remote site, and the relatively large amount of available space occupied by the lube skids limit the amount of space available for such tools, parts and other equipment.

BRIEF DESCRIPTION OF THE DRAWINGS

The novel features of the aspects described herein are set forth with particularity in the appended claims. The aspects, however, both as to organization and methods of operation may be better understood by reference to the following description, taken in conjunction with the accompanying drawings.

DETAILED DESCRIPTION

Figure 1:
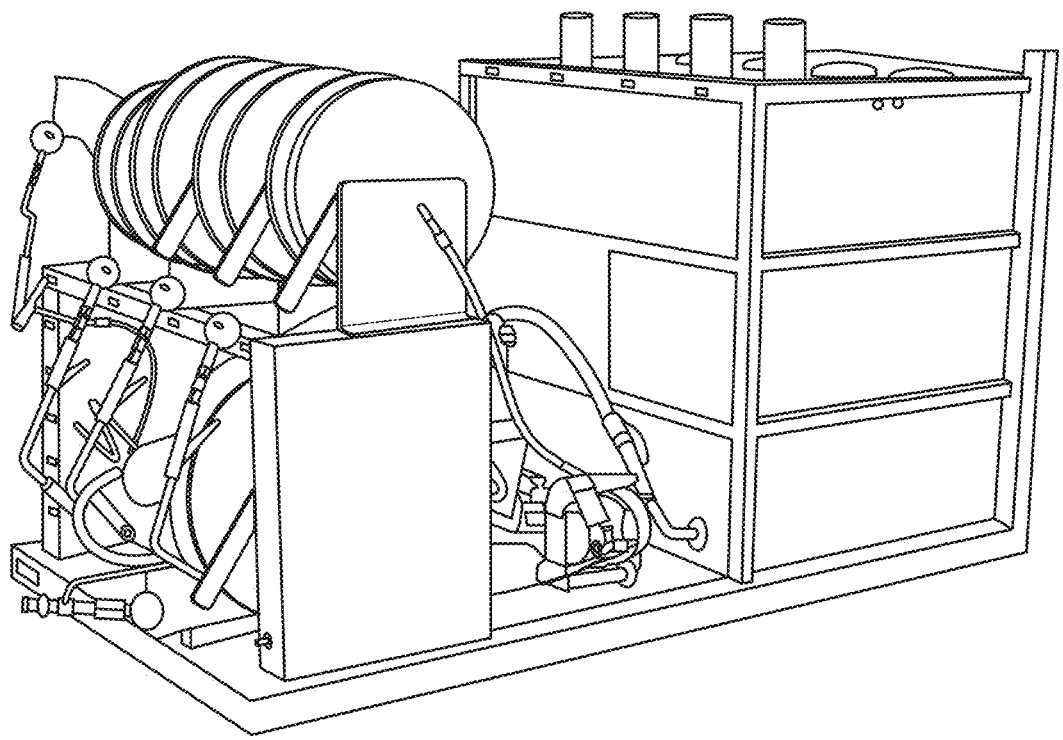
FIG. 1 illustrates a prior art lube skid.

It is to be understood that at least some of the figures and descriptions of the invention have been simplified to illustrate elements that are relevant for a clear understanding of the invention, while eliminating, for purposes of clarity, other elements that those of ordinary skill in the art will appreciate may also comprise a portion of the invention. However, because such elements are well known in the art, and because they do not facilitate a better understanding of the invention, a description of such elements is not provided herein.

In the following detailed description, reference is made to the accompanying drawings, which form a part hereof. In the drawings, similar symbols and reference characters typically identify similar components throughout several views, unless context dictates otherwise. The illustrative aspects described in the detailed description, drawings and claims are not meant to be limiting. Other aspects may be utilized, and other changes may be made, without departing from the scope of the technology described herein.

The following description of certain examples of the technology should not be used to limit its scope. Other examples, features, aspects, embodiments and advantages of the technology will become apparent to those skilled in the art from the following description, which is by way of illustration, one of the best modes contemplated for carrying out the technology. As will be realized, the technology described herein is capable of other different and obvious aspects, all without departing from the technology. Accordingly, the drawings and descriptions should be regarded as illustrative in nature and not restrictive.

It is further understood that any one or more of the teachings, expressions, aspects, embodiments, examples, etc. described herein may be combined with any one or more of the other teachings, expressions, aspects, embodiments, examples, etc. that are described herein. The following described teachings, expressions, aspects, embodiments, examples, etc. should therefore not be viewed in isolation relative to each other. Various suitable ways in which the teachings herein may be combined will be readily apparent to those of ordinary skill in the art in view of the teachings herein. Such modifications and variations are intended to be included within the scope of the claims.

Before explaining the various aspects of the vehicle body and the integrated fluid transfer system in detail, it should be noted that the various aspects disclosed herein are not limited in their application or use to the details of construction and arrangement of parts illustrated in the accompanying drawings and description. Rather, the disclosed aspects may be positioned or incorporated in other aspects, embodiments, variations and modifications thereof, and may be practiced or carried out in various ways. Accordingly, aspects of the vehicle body and the integrated fluid transfer system disclosed herein are illustrative in nature and are not meant to limit the scope or application thereof. Furthermore, unless otherwise indicated, the terms and expressions employed herein have been chosen for the purpose of describing the aspects for the convenience of the reader and are not meant to limit the scope thereof. In addition, it should be understood that any one or more of the disclosed aspects, expressions of aspects, and/or examples thereof, can be combined with any one or more of the other disclosed aspects, expressions of aspects, and/or examples thereof, without limitation.

Also, in the following description, it is to be understood that terms such as inward, outward, upward, downward, above, top, below, floor, left, right, side, interior, exterior and the like are words of convenience and are not to be construed as limiting terms. Terminology used herein is not meant to be limiting insofar as devices described herein, or portions thereof, may be attached or utilized in other orientations. The various aspects will be described in more detail with reference to the drawings.

Figure 2:
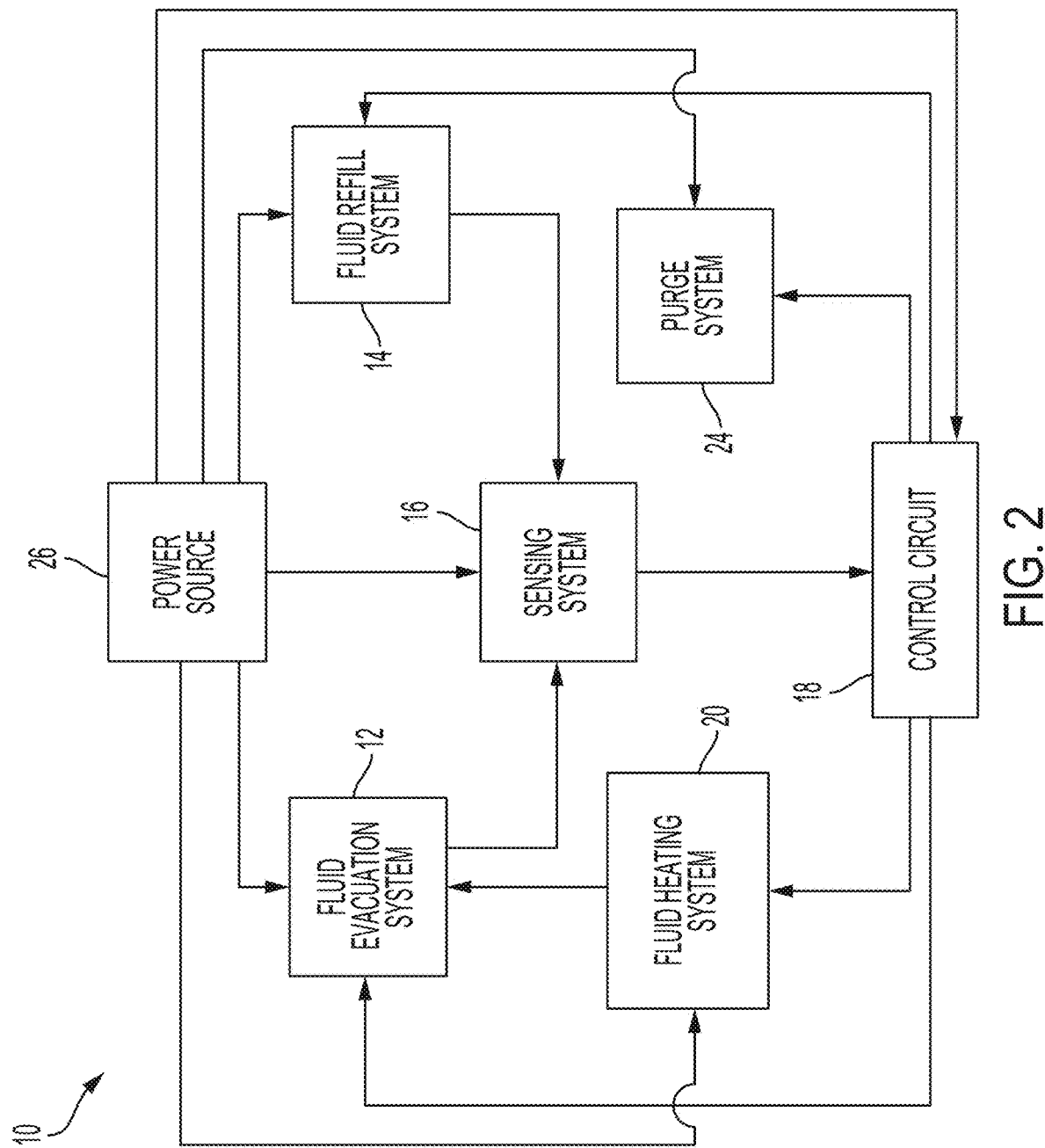
FIG. 2 illustrates a mobile fluid transfer system in accordance with at least one aspect of the present disclosure.

FIG. 2 illustrates a mobile fluid transfer system 10 in accordance with at least one aspect of the present disclosure. The mobile fluid transfer system 10 is configured to be loaded onto a mobile platform such as, for example, the bed of a wheeled vehicle, and/or positioned in an enclosed cargo area of the wheeled vehicle. The wheeled vehicle may be any suitable wheeled vehicle such as, for example, a truck, a trailer, etc. According to various aspects, the mobile fluid transfer system 10 forms a portion of the mobile platform. Once the mobile fluid transfer system 10 has been loaded and/or positioned onto the mobile platform, the mobile fluid transfer system 10 can then be transported to a remote job site to be utilized for transferring one or more fluids to and from a machine. According to various aspects, the mobile fluid transfer system 10 is equipped with forklift channels which allows for the mobile fluid transfer system 10 to be loaded onto the bed of a wheeled vehicle with a forklift. According to other aspects, the mobile fluid transfer system 10 is equipped with lifting lugs (eye bolts, hoist rings or the like) which allows for the mobile fluid transfer system 10 to be loaded onto the bed of a wheeled vehicle with a crane or other similar machine. The mobile fluid transfer system 10 may be utilized with any number of different fluids and any number of different machines. For example, according to various aspects, the mobile fluid transfer system 10 may be utilized to remove engine oil from an earth moving machine (e.g., an excavator, a high-lift, a bulldozer, etc.) and refill the earth moving machine with clean, pre-filtered engine oil. Similarly, the mobile fluid transfer system 10 may be utilized to remove and replace engine oil from a machine other than an earth moving machine. For example, the mobile fluid transfer system 10 may be utilized to remove and replace engine oil from a compactor, a generator, a truck, an automobile, an engine powered apparatus and the like. According to other aspects, the mobile fluid transfer system 10 may be utilized to remove and replace a fluid (e.g., transmission fluid, hydraulic fluid, gear oil, steering fluid, etc.) other than engine oil from a machine. For purposes of simplicity, the mobile fluid transfer system 10 will be described hereinafter in the context of being employed to remove and refill engine oil of an earth moving machine. However, it will be appreciated that the mobile fluid transfer system 10 may be utilized with any number of different fluids and any number of different machines.

The mobile fluid transfer system 10 includes a fluid evacuation system 12, a fluid refill system 14, a sensing system 16 and a control circuit 18. According to various aspects, the mobile fluid transfer system 10 also includes a fluid heating system 20, a fluid containment system 22 (See FIG. 7) and a purge system 24. According to various aspects, the mobile fluid transfer system 10 further includes a power source 26 such as, for example, a battery. According to other aspects, electrical power can be provided to the mobile fluid transfer system 10 by the wheeled vehicle which transports the mobile fluid transfer system 10 to the remote job site, or by a machine being serviced by the mobile fluid transfer system 10. Electrical power to operate the mobile fluid transfer system 10 can be direct current (DC) power provided by the wheeled vehicle which transports the mobile fluid transfer system 10 to the remote job site (e.g., from a battery of the wheeled vehicle), alternating current (AC) power from a machine being serviced by the mobile fluid transfer system 10 (e.g., from an electrical outlet powered by the machine), or direct current (DC) power from the power source 26.

Figure 3:
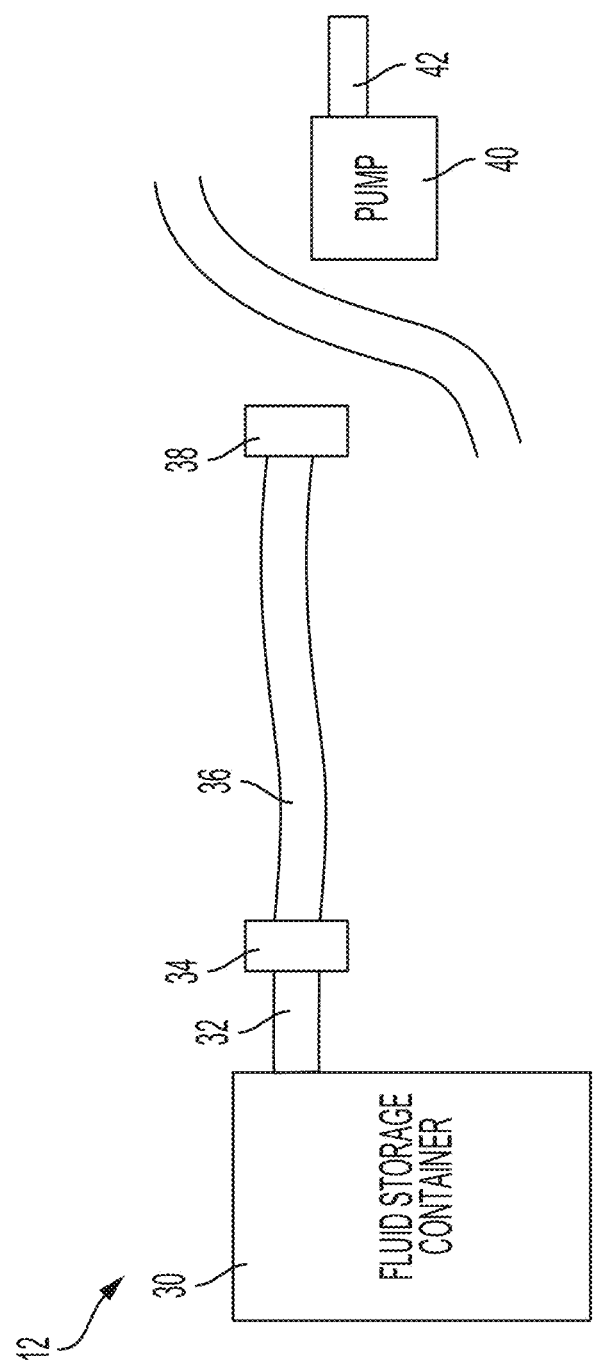
FIG. 3 illustrates a fluid evacuation system of the mobile fluid transfer system of FIG. 2 in accordance with at least one aspect of the present disclosure.

FIG. 3 illustrates a fluid evacuation system 12 of the mobile fluid transfer system 10 of FIG. 2 in accordance with at least one aspect of the present disclosure. The fluid evacuation system 12 includes a fluid storage container 30 configured to store engine oil evacuated from the earth moving machine. The engine oil evacuated from the earth moving machine may be referred to as waste oil. The fluid storage container 30 may be of any suitable size and shape. For example, according to various aspects, the fluid storage container 30 may be sized to hold 50 gallons of waste oil, 75 gallons of waste oil, 100 gallons of waste oil, 150 gallons of waste oil, etc., and may be configured in a cylindrical shape, a rectangular shape or a square shape. Although only one fluid storage container 30 is shown in FIG. 3, it will be appreciated that the fluid evacuation system 12 may include any number of fluid storage containers 30, and the various fluid storage containers 30 can be of different sizes and different shapes.

The fluid evacuation system 12 also includes piping 32 (or hosing) coupled to an inlet of the fluid storage container 30, a shut-off valve 34 coupled to the piping 32, hosing 36 coupled to the shut-off valve 34 and a connector 38 (e.g., a quick fit connector) coupled to an end of the hosing 36. The shut-off valve 34 can be utilized to stop the flow of waste oil into the fluid storage container 30. According to various aspects, the shut-off valve 34 is operated manually. According to other aspects, the shut-off valve 34 is a solenoid valve which is controlled automatically by the control circuit 18. For such aspects, the fluid evacuation system 12 is coupled to the control circuit 18. The hosing 36 is wound on a hose reel (not shown) which is similar to the hose reels shown in FIG. 8, and can be extended to reach the earth moving machine and/or a portable pump 40 (shown in dashed lines) which is positioned proximate the earth moving machine. The hosing 36 may be of any suitable length and any suitable diameter. For example, according to various aspects, the hosing 36 may be 50 feet in length, 75 feet in length or 100 feet in length, and may have a diameter of ½", ¾" or 1". For instances where the connector 38 is coupled to the portable pump 40, the pump is also coupled to the earth moving machine by hosing 42 which may include a connector (e.g., a quick fit connector) which connects the hosing 42 to a valve assembly (e.g., a quick fit valve assembly) at the earth moving machine. By positioning the portable pump 40 proximate to the earth moving machine, the distance the portable pump 40 has to suck the engine oil from the earth moving machine (i.e., the distance of the suction line) is reduced, thereby allowing for increased flowrates and/or efficiency associated with the fluid evacuation system 12. The engine oil sucked to the portable pump 40 is then pushed to the fluid storage container 30. According to various aspects, the portable pump 40 and the hosing 42 are part of the fluid evacuation system 12. By utilizing the portable pump 40 to apply a negative pressure to a valve assembly (e.g., a quick fit valve assembly) at the earth moving machine, the valve assembly operates to allow the waste oil to be evacuated from the earth moving machine, and the evacuated waste oil is subsequently delivered to the fluid storage container 30. According to various aspects, the portable pump 40 may include a pressure relief valve which is set to a pressure which is less than the working pressure of the hosing 36 and/or the hosing 42.

According to other aspects, in lieu of the portable pump 40 being utilized, the fluid evacuation system 12 includes a pump (not shown) which is permanently positioned proximate to the fluid storage container 30. For such instances, the connector 38 at the end of the hosing 36 may be connected directly to a valve assembly (e.g. a quick fit valve assembly) which is connected directly to the earth moving machine. According to various aspects, the pump and/or the portable pump 40 may be powered by direct current (DC) power, alternating current (AC) power, or air power (pneumatic) provided by the mobile fluid transfer system 10, the wheeled vehicle which transports the mobile fluid transfer system 10 to the remote job site, the machine being serviced by the mobile fluid transfer system 10, or another external source. For example, according to some aspects, the pump and/or the portable pump 40 is powered by direct current (DC) power from a battery of the wheeled vehicle. According to other aspects, the pump and/or the portable pump 40 is powered by alternating current (AC) power from an electrical outlet powered by a machine being serviced by the mobile fluid transfer system 10. According to yet other aspects, the pump and/or the portable pump 40 is powered by direct current (DC) power from the power source 26. According to yet other aspects, the pump and/or the portable pump is pneumatically powered from an external source.

According to various aspects, the control circuit 18 is configured to provide certain safeguards for the operation of the fluid evacuation system 12. For example, the control circuit 18 is configured to verify the shut-off valve 34 is open before energizing the portable pump 40 with DC power. If the control circuit 18 determines the valve 34 is closed and the fluid storage container 30 is not full (as described in more detail hereinbelow), the control circuit 18 will open the valve 34 and energize the portable pump 40 to allow for the evacuation of the waste oil from the earth moving machine. However, if the control circuit 18 determines the valve 34 is closed and the fluid storage container 30 is full (as described in more detail hereinbelow), the control circuit 18 will not oven the valve 34 and will not energize the portable pump 40 to allow for the evacuation of the waste oil from the earth moving machine.

Figure 4:
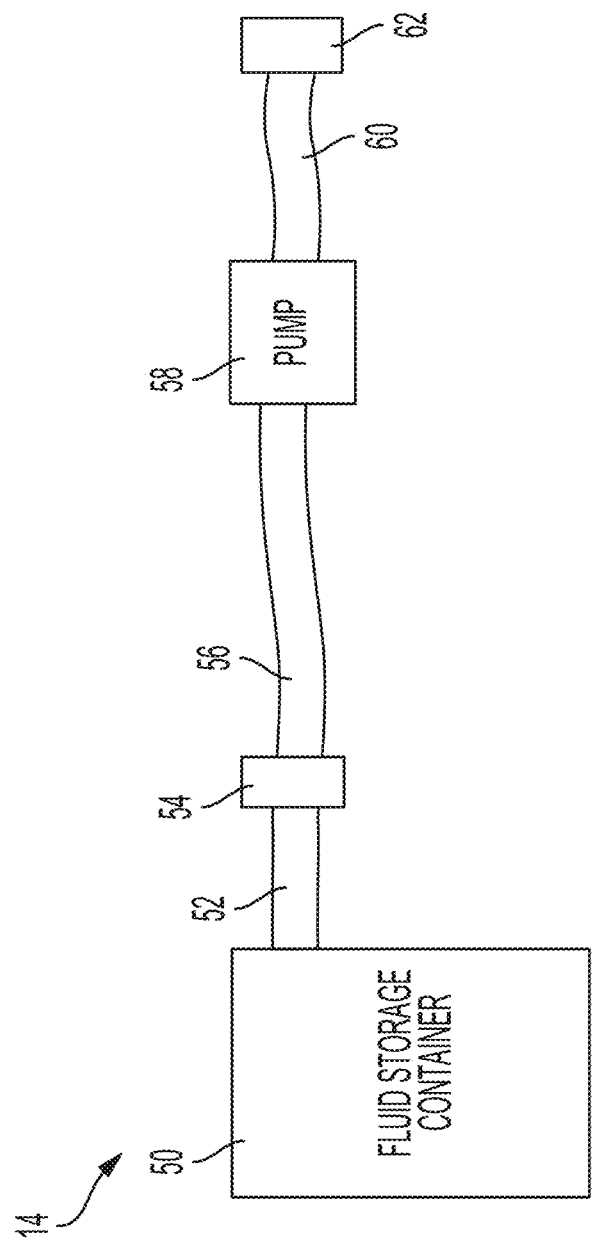
FIG. 4 illustrates a fluid refill system of the mobile fluid transfer system of FIG. 2 in accordance with at least one aspect of the present disclosure.

FIG. 4 illustrates a fluid refill system 14 of the mobile fluid transfer system 10 of FIG. 2 in accordance with at least one aspect of the present disclosure. The fluid refill system 14 includes a fluid storage container 50 configured to store clean, filtered engine oil which can be utilized to refill the earth moving machine with engine oil. The clean, filtered engine oil stored in the fluid storage container 50 may be referred to as new oil. The fluid storage container 50 may be of any suitable size and shape. For example, according to various aspects, the fluid storage container 50 may be sized to hold 50 gallons of new oil, 75 gallons of new oil, 100 gallons of new oil, 150 gallons of new oil, etc., and may be configured in a cylindrical shape, a rectangular shape or a square shape. Although only one fluid storage container 50 is shown in FIG. 4, it will be appreciated that the fluid refill system 14 may include any number of fluid storage containers 50, and the various fluid storage containers 50 can be of different sizes and different shapes.

The fluid refill system 14 also includes piping 52 (or hosing) coupled to an outlet of the fluid storage container 50, a shut-off valve 54 coupled to the piping 52, piping 56 (or hosing) coupled to the shut-off valve 54, a pump 58 having an inlet coupled to the piping 56, hosing 60 coupled to an outlet of the pump 58, and a connector 62 (e.g., a quick fit connector) coupled to an end of the hosing 60. The shut-off valve 54 can be utilized to stop the flow of new oil to the earth moving machine. According to various aspects, the shut-off valve 54 is operated manually. According to other aspects, the shut-off valve 54 is a solenoid valve which is controlled automatically by the control circuit 18. For such aspects, the fluid refill system 14 is coupled to the control circuit 18. The hosing 60 is wound on a hose reel (not shown) which is similar to the hose reels shown in FIG. 8, and can be extended to reach the earth moving machine. The hosing 60 may be of any suitable length and any suitable diameter. For example, according to various aspects, the hosing 60 may be 50 feet in length, 75 feet in length or 100 feet in length, and may have a diameter of ½", ¾" or 1". The connector 62 at the end of the hosing 60 may be connected directly to a valve assembly (e.g., a quick fit valve assembly) which is connected directly to the earth moving machine. By utilizing the pump 58 to apply a positive pressure to the valve assembly, the valve assembly operates to allow the new oil from the fluid storage container 50 to be delivered to the earth moving machine.

According to various aspects, the pump 58 may be powered by direct current (DC) power, alternating current (AC) power, or air power (pneumatic) provided by the mobile fluid transfer system 10, the wheeled vehicle which transports the mobile fluid transfer system 10 to the remote job site, the machine being serviced by the mobile fluid transfer system 10, or another external source. For example, according to various aspects, the pump 58 is powered by direct current (DC) power from a battery of the wheeled vehicle. According to other aspects, the pump 58 is powered by alternating current (AC) power from an electrical outlet powered by a machine being serviced by the mobile fluid transfer system 10. According to yet other aspects, the pump 58 is powered by direct current (DC) power from the power source 26. According to yet other aspects, the pump 58 is pneumatically powered from an external source.

Figure 5B:
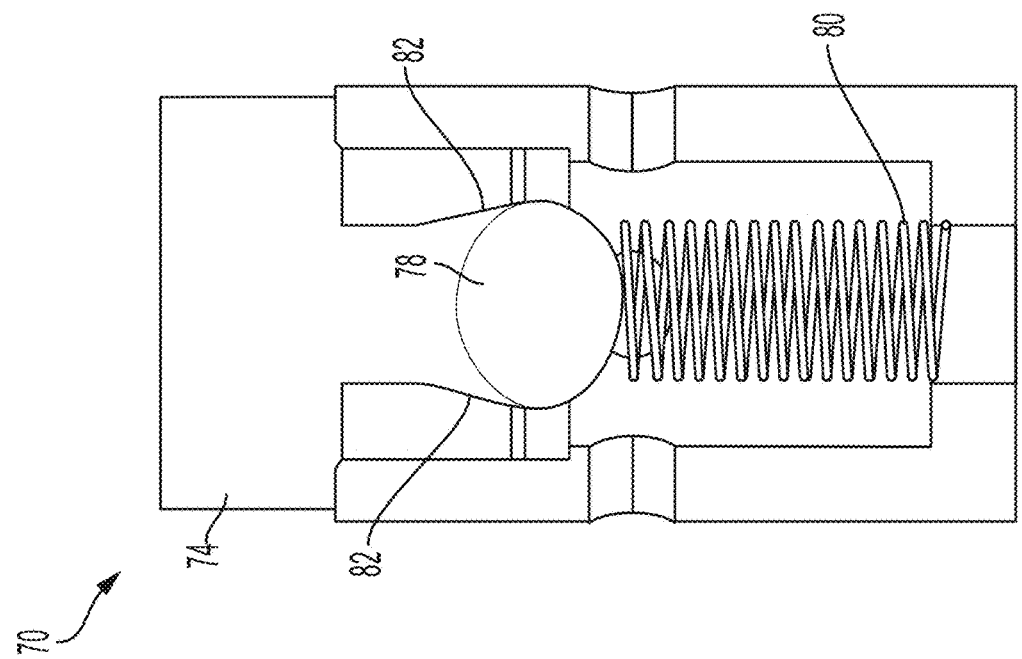
FIGS. 5A and 5B illustrate a rollover protection system of the mobile fluid transfer system of FIG. 2 in accordance with at least one aspect of the present disclosure.
Figure 5A:
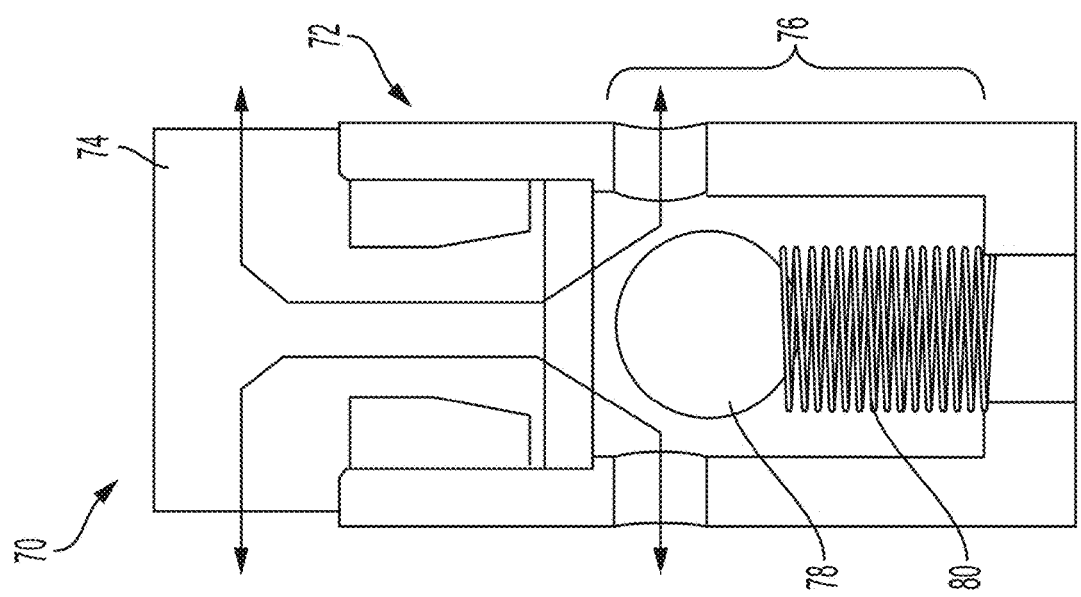

FIGS. 5A and 5B illustrate a rollover protection system 70 of the mobile fluid transfer system 10 of FIG. 2 in accordance with at least one aspect of the present disclosure. Each of the fluid storage containers 30, 50 may be equipped with its own rollover protection system 70. The rollover protection system 70 is configured to keep the fluids inside the fluid storage containers 30, 50 if the mobile fluid transfer system 10 were to be overturned, either on its side (90° protection), upside down (180° protection) or a position inbetween. For purposes of simplicity, the rollover protection system 70 will be described in the context of its applicability to the fluid storage container 50. However, it will be appreciated that the following description of the rollover protection system 70 is equally applicable to the fluid storage container 30. As shown in FIG. 5A, an air vent 72 of the fluid storage container 50 can include a filter 74 and a check valve 76 incorporated therein. The air vent 72 is configured to allow air within the fluid storage container 50 to flow through the air vent 72 to the outside of the fluid storage container 50. Similarly, air outside of the fluid storage container 50 can flow through the air vent 72 to the inside of the fluid storage container 50. Because the air vent 72 is configured to facilitate airflow to and from the fluid storage container 50, the air vent 72 can be further configured to prevent the introduction of external contaminants to the clean, pre-filtered fluid in the fluid storage container 50. Although only one air vent 72 is shown in FIGS. 5A and 5B, it will be appreciated that the fluid storage container 50 may include more than one air vent 72, and the fluid storage container 30 may include more than one air vent 72.

According to various aspects, the filter 74 includes a sintered brass medium which defines a plurality of openings which the air passes through when entering or exiting the fluid storage container 50. The plurality of openings can be of any suitable size. For example, according to various aspects, the size of one or more of the openings can be as small as 2 microns. According to other aspects, the size of the one or more of the openings can be as large as 40 microns. According to yet other aspects, the openings can be sized to prevent particulate larger than 10 microns from passing through the openings. Thus, the filter 74 can be utilized to prevent certain pollutants from reaching the interior of the fluid storage container 50, as well as to prevent the fluids within the fluid storage containers 50, 70 from spilling out from the fluid storage containers 50, 70, through the air vent 72 and to the outside of the fluid storage containers 30, 50 whenever the wheeled vehicle which transports the mobile fluid transfer system 10 is subjected to bumps in the road or certain other road/jobsite conditions. According to other aspects, the filter 74 may include a material other than sintered brass (e.g., a sintered bronze medium, a sintered nickel medium, a nickel material, an aluminum material, etc.).

According to various aspects, the check valve 76 may be placed directly in a vent location of the fluid storage container 50 or in a location remote from the fluid storage container 50, where the remote location is attached to the vent location with hosing/piping. The check valve 76 is configured to allow air to flow into and out of the fluid storage container 50 when the fluid storage container 50 is in an "upright" position. The check valve 76 is also configured to transition between an unbiased position (See FIG. 5A) and a biased position (See FIG. 5B). According to various aspects, the check valve 76 includes a ball 78 and a biasing element 80 such as, for example, a spring. When the fluid storage container 50 is in its normal upright position, the ball 78 exerts a downward force on the biasing element 80 such that the biasing element 80 is in a compressed condition. The ball 78 rests on top of the compressed biasing element 80, and the position of the ball 78 as shown in FIG. 5A allows air to flow into or out of the fluid storage container 50. Stated differently, the position of the ball 78 does not operate to block air from entering or exiting the fluid storage container 50. However, when the fluid storage container 50 is positioned sideways or upside down (i.e., due to the mobile fluid transfer system 10 being turning on its side or upside down), the downward force exerted by the ball 78 on the biasing member 80 is decreased or eliminated such that the biasing element 80 is able to overcome any downward force exerted by the ball 78 and extend to a less compressed condition. The extension of the biasing member 80 to the less compressed condition causes the ball 78 to be moved to the position as shown in FIG. 5B, where the ball 78 is set against the tapered wall 82 of the air vent 72. In this position, the ball 78 operates to block any fluid within the fluid storage container 50 from exiting the fluid storage container 50 via the air vent 72, as well as any air from entering or exiting the fluid storage container 50.

Although the check valve 76 is described above as including a ball and seat configuration, according to other aspects, alternate configurations such as a swing, lift, dual plate, and/or stop check type configurations are also contemplated by the present disclosure. According to such aspects, the check valve 76 may include components such as swing hinges, a duck bills, dual plates, and discs to accomplish the same effect. Additionally, according to yet other aspects, the rollover protection system 70 may include an actuator which is utilized to transition the check valve 76 between a biased position and an unbiased position, and vice versa. For such aspects, the actuator may be controlled by the control circuit 18 in response to a signal output by a sensing device which is configured to measure an orientation of the mobile fluid transfer system 10 and/or the fluid storage container 50.

Figure 5C:
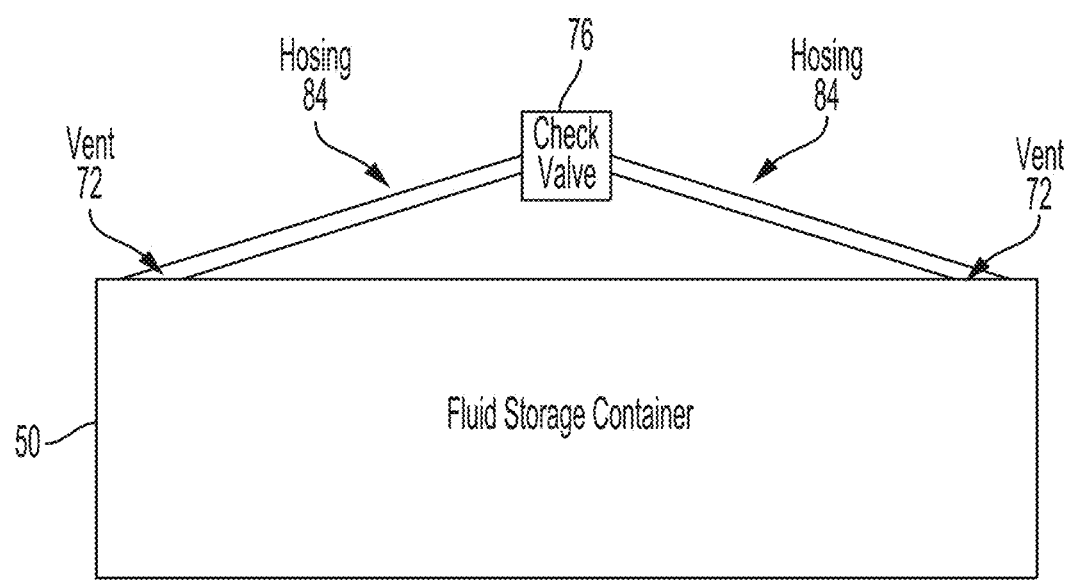
FIG. 5C illustrates a check valve of the rollover protection system of FIGS. 5A and 5B, in accordance with at least one aspect of the present disclosure.

FIG. 5C illustrates the check valve 76 of the rollover protection system 70, in accordance with at least one aspect of the present disclosure. As shown in FIG. 5C, the check valve 76 is positioned in a location remote from the fluid storage container 50, and is connected to an air vent 72 on each side of the fluid storage container 50 via hosing/piping 84. This arrangement allows for fluid/air to balance out in instances where the fluid storage container 50 is situated at an angle relative to its standard "level-to-the-ground" orientation. It will be appreciated that the features illustrated and described with reference to FIG. 5C are equally applicable to the fluid storage container 30.

Figure 6:
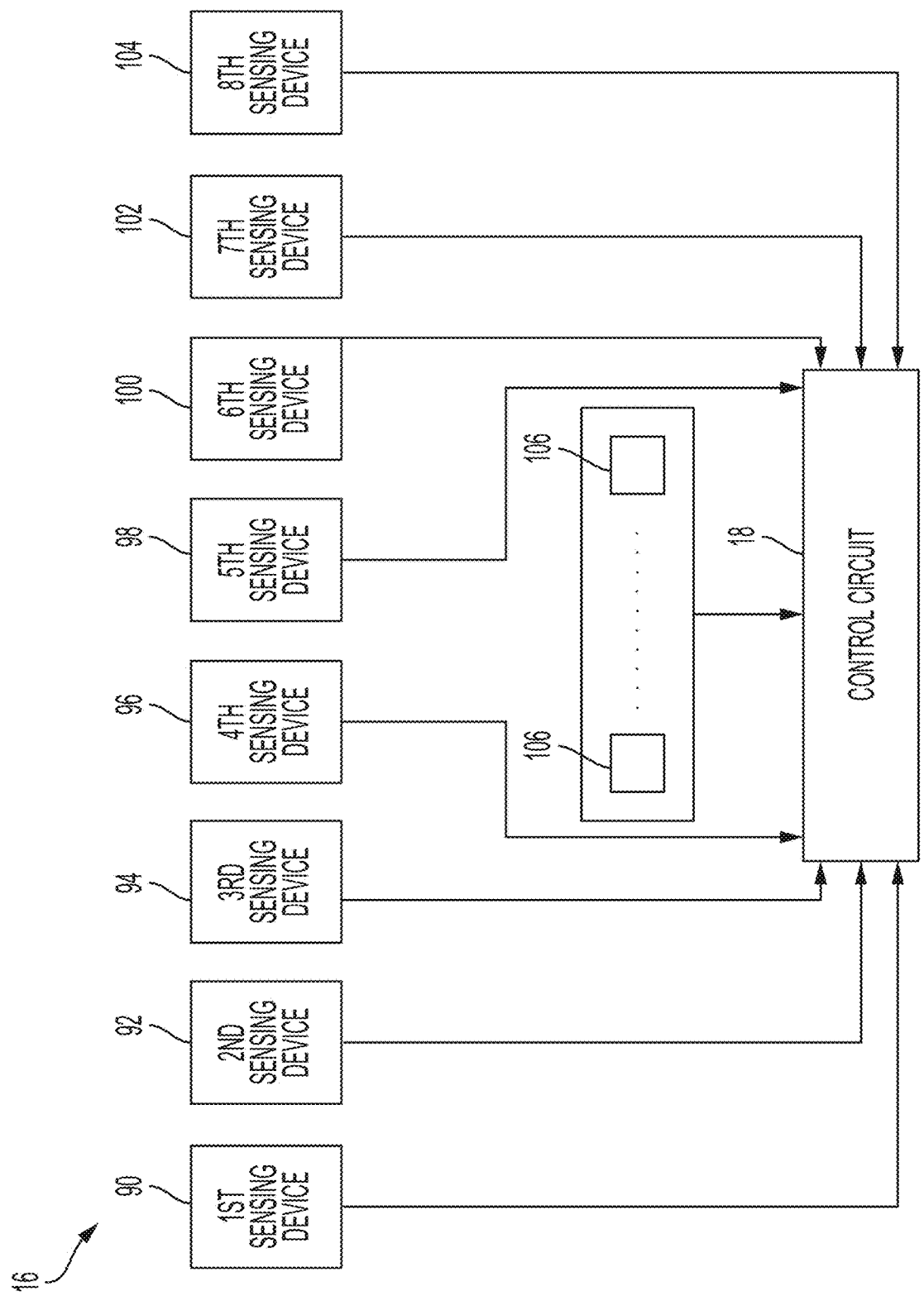
FIG. 6 illustrates a sensing system of the mobile fluid transfer system of FIG. 2 in accordance with at least one aspect of the present disclosure.

FIG. 6 illustrates a sensing system 16 of the mobile fluid transfer system 10 of FIG. 2 in accordance with at least one aspect of the present disclosure. The sensing system 16 is coupled to the fluid evacuation system 12, to the fluid refill system 14 and to the control circuit 18. According to various aspects, the sensing system 16 is also coupled to the power source 26. According to various aspects, the sensing system 16 is coupled to the fluid evacuation system 12, to the fluid refill system 14 and/or to the control circuit 18 via hard wires. According to other aspects, one or more portions of the sensing system 16 are wirelessly coupled to the fluid evacuation system 12, to the fluid refill system 14 and/or to the control circuit 18. The sensing system 16 includes a plurality of different sensing devices. According to various aspects, the sensing system 16 includes a first sensing device 90 and a second sensing device 92. The first sensing device 90 may be positioned at the "top" of the fluid storage container 30 and is configured to measure a level/height of the waste oil in the fluid storage container 30. The sensing system 16 may include a separate first sensing device 90 for each fluid storage container 30 of the fluid evacuation system 12. The second sensing device 92 may be positioned at the "top" of the fluid storage container 50 and is configured to measure a level/height of the new oil in the fluid storage container 50. The sensing system 16 may include a separate second sensing device 92 for each fluid storage container 50 of the fluid refill system 14. According to various aspects, the first sensing device 90 forms a portion of the fluid evacuation system 12 and the second sensing device 92 forms a portion of the fluid refill system 14.

According to various aspects, the first and/or second sensing devices 90, 92 may be implemented as an ultrasonic device, a laser device, a radar device, a magnetorestrictive device, a pressure transducer and the like. According to other aspects, the first and/or second sensing devices 90, 92 may be implemented as a mechanical sensing device. For an ultrasonic device, the time it takes for an ultrasound pulse to travel from a transducer to the surface of the waste oil (or from a transducer to the surface of the new oil) and back to the transducer can be utilized to determine the volume of the oil in a given fluid storage device 30, 50. For a laser device, the time it takes for a pulse of light to travel from a transmitter to the surface of the waste oil (or from a transducer to the surface of the new oil) and back to the transmitter can be utilized to determine the volume of the oil in a given fluid storage device 30, 50. For a radar device, the time it takes for a microwave to travel from an antenna to the surface of the waste oil (or from a transducer to the surface of the new oil) and back to the antenna can be utilized to determine the volume of the oil in a given fluid storage device 30, 50. By knowing the pre-determined shapes (e.g., cylindrical, rectangular, square) of the respective fluid storage containers 30, 50 and by knowing the level/height of the fluid within the respective fluid storage containers 30, 50, the precise volumes of the fluids within the respective fluid storage containers 30, 50 can be readily determined by the control circuit 18 in real time (or in near real time) as explained in more detail hereinbelow. By utilizing the first and second sensing devices 90, 92 in lieu of the flow meters utilized by known mobile fluid transfer systems, the flow restrictions introduced by the flow meters are eliminated, thereby allowing the fluid evacuation system 12 and the fluid refill system 14 to transport the waste oil and the new oil at a faster rate (e.g., 15-20 gallons per minute) than the 4-5 gallons per minute realized by known mobile fluid transfer systems. According to other aspects, the first and/or second sensing devices 90, 92 may be implemented by sensing devices other than ultrasonic devices, laser devices, radar devices, magnetorestrictive devices or pressure transducers. According to various aspects, the mobile fluid transfer system 10 may also include a mechanical float valve for the fluid storage container 30 and a mechanical float valve for the fluid storage container 50 to provide redundancy for the first and second sensing devices 90, 92.

According to various aspects, the first and second sensing devices 90, 92 are setup to help define the usable capacity of the fluid storage containers 30, 50. The usable capacity of the fluid storage container 30 may be considered to be the total volume inside the fluid storage container 30, minus a residual fluid volume at the bottom of the fluid storage container 30, minus an air gap volume at the top of the fluid storage container 30. A top of the residual fluid volume is set to a first predetermined height (a zero level) above the floor/bottom of the fluid storage container 30 and a bottom of the air gap volume is set to a second predetermined height (a full level) above the floor/bottom of the fluid storage container 30. The air gap volume operates to minimize spillage coming up through the air vent 72 as the motion of the mobile platform (e.g., going around corners, stopping or starting quickly, etc.) causes the fluid in the fluid storage container 30 to slosh. The usable capacity of the fluid storage containers 50 may be determined in the same manner.

Figure 6A:
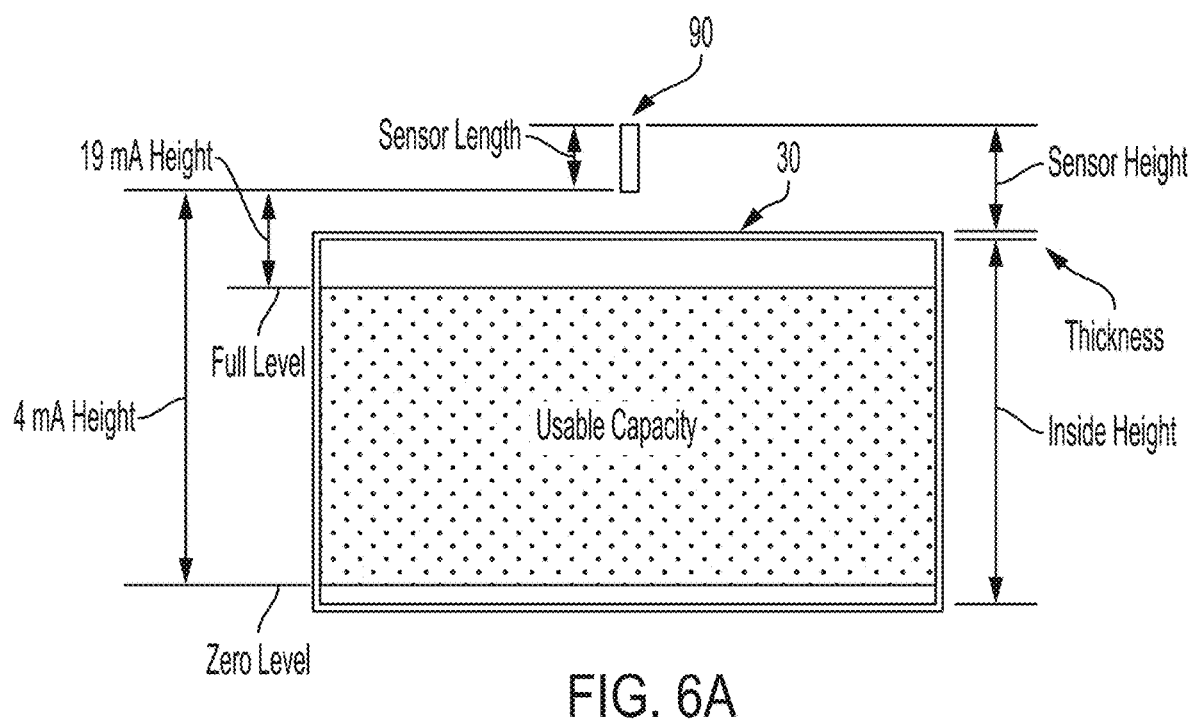
FIG. 6A illustrates a setup of a first sensing device of the sensing system of FIG. 6, in accordance with at least one aspect of the present disclosure.

FIG. 6A illustrates a setup of the first sensing device 90, in accordance with at least one aspect of the present disclosure. Based on the time of flight data (e.g., the time it takes for an ultrasound pulse to travel from a transducer to the surface of the fluid in the fluid storage container 30 and back to the transducer), the first sensing device 90 is configured to output a signal indicative of the height of the fluid in the fluid storage container 30. As shown in FIG. 6A, the signal can be in units of milliamperes (e.g., 4-20 milliamperes). According to other aspects, the signal can be in in units of volts (e.g., 0-10 volts). For aspects where the first sensing device 90 is a 4-20 milliampere sensing device, the zero level in the fluid storage compartment 30 is set based on the height in the fluid storage container 30 where the first sensing device 90 outputs a 4 milliampere signal responsive to the time of flight data, and the full level in the fluid storage compartment 30 is set based on the height in the fluid storage compartment 30 where the first sensing device 90 outputs a 19 milliampere signal responsive to the time of flight data. The control circuit 18 is configured to plot the zero level height (i.e., the 4 milliampere signal) and the full level height (i.e., the 19 milliampere signal), then use the straight line equation y=mx+b to extrapolate respective heights of fluid in the fluid storage container 30 associated with respective signals between 4 milliamperes and 19 milliamperes output by the first sensing device 90. For example, a signal of 11.5 milliamperes would be associated with a height being located equidistant from the zero level and the full level. Based on a given height associated with a given output signal of the first sensing device 90, and the known length and width of the fluid storage container 30, the control circuit 18 is configured to calculate the volume of "waste oil" present in the fluid storage container 30. According to other aspects, the control circuit 18 may utilize a lookup table to determine the volume of "waste oil" present in the fluid storage container 30 based on a given height associated with a given output signal of the first sensing device 90. The second sensing device 92 may be setup in the same manner as described above for the fluid storage container 50. With the above-described setup, fluid viscosity calibration of the sensing devices 90, 92 is not needed and the sensing devices 90, 92 provide greater accuracy across a wide range of fluids than the flow meters of known lube skids. In view of the above-described functionality of the first and second sensing devices 90, 92, it will be appreciated that the outputs of the first and second sensing devices 90, 92 may be utilized by the control circuit 18 to prevent the fluid storage containers 30, 50 from being overfilled.

Returning to FIG. 6, according to various aspects, the sensing system 16 further includes a third sensing device 94 and a fourth sensing device 96. The third sensing device 94 is configured to output a signal when the level of the fluid in the fluid storage container 30 has reached or exceeded a predetermined threshold. Similarly, the fourth sensing device 96 is configured to output a signal when the level of the fluid in the fluid storage container 50 has reached or exceeded a predetermined threshold. The predetermined threshold for the fluid level in the fluid storage container 30 can be the same as or different from the predetermined threshold for the fluid level in the fluid storage container 50. As explained in more detail hereinbelow, responsive to the output signals of the third and/or fourth sensing devices 94, 96, the control circuit 18 can initiate an audible alarm via a speaker of the mobile fluid transfer system 10 and/or a visual alarm via an indicator (e.g., a light emitting diode) or via a display of the mobile fluid transfer system 10, as well as disconnect electrical power to the supplemental pump 40 and/or the pump 58. Although the control circuit 18 can also be configured to initiate the audible alarm, the visual alarm and/or disconnect electrical power to the supplemental pump 40 and/or the pump 58 based on the signals output by the first and second sensing devices 90, 92 (which indicate the levels of the fluids in the fluid storage containers 30, 50), the third and fourth sensing devices 94, 96 offer a level of redundancy to help mitigate the chance of any inadvertent overfilling of the fluid storage containers 30, 50. According to various aspects, the third sensing device 94 forms a portion of the fluid evacuation system 12 and the fourth sensing device 96 forms a portion of the fluid refill system 14. In view of the above-described functionality of the third and fourth sensing devices 94, 96, it will be appreciated that the outputs of the third and fourth sensing devices 94, 96 may be utilized by the control circuit 18 to prevent the fluid storage containers 30, 50 from being overfilled.

According to other aspects, the functionality of the third and fourth sensing devices 94, 96 may be performed by the first and second sensing devices 90, 92. For example, any signals output by the first or second sensing devices 90, 92 which are greater than 19 milliamperes can be interpreted by the control circuit 18 as the fluid in the fluid storage containers 30, 50 having reached or exceeded the predetermined threshold, with the control circuit 18 then taking the above-described actions in response thereto.

According to various aspects, the sensing system 16 also includes a fifth sensing device 98. The fifth sensing device 98 is configured to measure an orientation of the mobile fluid transfer system 10 (e.g., relative to the normal upright position of the mobile fluid transfer system 10), and by extension, an orientation of the fluid storage containers 30, 50. Alternatively, the sensing system 16 may include two or more fifth sensing devices 98 (e.g., one for measuring the orientation of the fluid storage container 30 and another one for measuring the orientation of the fluid storage container 50). The fifth sensing device 98 is further configured to output a signal indicative of the orientation of the mobile fluid transfer system 10, of the fluid storage container 30 and/or of the fluid storage container 50. As explained hereinabove, the control circuit 18 may control an actuation member of the rollover protection system 70 based on the signal output by the fifth sensing device 98. According to various aspects, responsive to the output signal of the fifth sensing device 98, the control circuit 18 can initiate an audible alarm via a speaker of the mobile fluid transfer system 10 and/or a visual alarm via an indicator (e.g., a light emitting diode) or via a display of the mobile fluid transfer system 10, as well as disconnect electrical power to the supplemental pump 40 and/or the pump 58. According to various aspects, the control circuit 18 may also close the shutoff valve 34 and/or the shutoff valve 54 if any of these valves are open when the output signal of the fifth sensing device 98 is indicative of a rollover event. According to various aspects, the fifth sensing device 98 forms a portion of the fluid evacuation system 12 and/or a portion of the fluid refill system 14.

According to various aspects, the sensing system 16 also includes a sixth sensing device 100. The sixth sensing device 100 is configured to detect a presence of a fluid which is proximate to a floor of the fluid containment system 22 (See FIG. 8) and is external to the fluid storage containers 30, 50. As explained in more detail hereinbelow, the fluid containment system 22 surrounds the fluid storage containers 30, 50. The presence of a fluid at this location is indicative of a fluid leak or an overflow situation associated with the fluid storage container 30 and/or the fluid storage container 50. The sixth sensing device 100 is also configured to output a signal indicative of the presence of the fluid. According to various aspects, responsive to the output signal of the sixth sensing device 100, the control circuit 18 can initiate an audible alarm via a speaker of the mobile fluid transfer system 10 and/or a visual alarm via an indicator (e.g., a light emitting diode) or via a display of the mobile fluid transfer system 10, as well as disconnect electrical power to the supplemental pump 40 and/or the pump 58.

According to various aspects, the sensing system 16 further includes a seventh sensing device 102 and an eighth sensing device 104. The seventh sensing device 102 may be positioned either on a "side" of the fluid storage container 30 or within the fluid storage container 30, and is configured to measure a temperature of the fluid in a given zone of the fluid storage container 30. The seventh sensing device 102 is further configured to output a signal which is representative of a temperature of the waste oil in the given zone of the fluid storage container 30. Similarly, the eighth sensing device 104 may be positioned either on a "side" of the fluid storage container 50 or within the fluid storage container 50, and is configured to measure a temperature of the fluid in a given zone of the fluid storage container 50. The eighth sensing device 104 is further configured to output a signal which is representative of a temperature of the new oil in the given zone of the fluid storage container 50. As explained in more detail hereinbelow, the signals output by the seventh and eighth sensing devices 102, 104 may be utilized by the control circuit 18 to control heating of the waste oil in the fluid storage container 30 and/or the new oil in the fluid storage container 50. According to various aspects, the seventh sensing device 102 forms a portion of the fluid evacuation system 12 and the eighth sensing device 104 forms a portion of the fluid refill system 14.

According to various aspects, the sensing system 16 may also include one or more sensing devices 106 which are collectively utilized to determine parameters associated with the waste oil. Such parameters are associated with a quality/condition of the waste oil and can include, for example, degradation, contamination (e.g., fuel, coolant), acidity, water content, dilution, antioxidant depletion, metallic content, debris, soot, temperature, viscosity, particle count and the like. According to various aspects, the waste oil can be analyzed in real time or in near real time while in route from the machine to the fluid storage container 30. For such aspects, the one or more sensing devices 106 measure various properties of the oil (e.g., dielectric constant, inductive characteristics, optical properties, spectrographic characteristics, magnetic properties, etc.) and output signals indicative of the measurements. According to other aspects, the waste oil can be captured and isolated while in route from the machine to the fluid storage container 30, and the captured waste oil can be similarly analyzed externally to the mobile fluid transfer system 10. The control circuit 18 utilizes the output signals of the one or more sensing devices 106 to determine the parameters associated with the waste oil. According to various aspects, the one or more sensing devices 106 form a portion of the fluid evacuation system 12.

Figure 7:
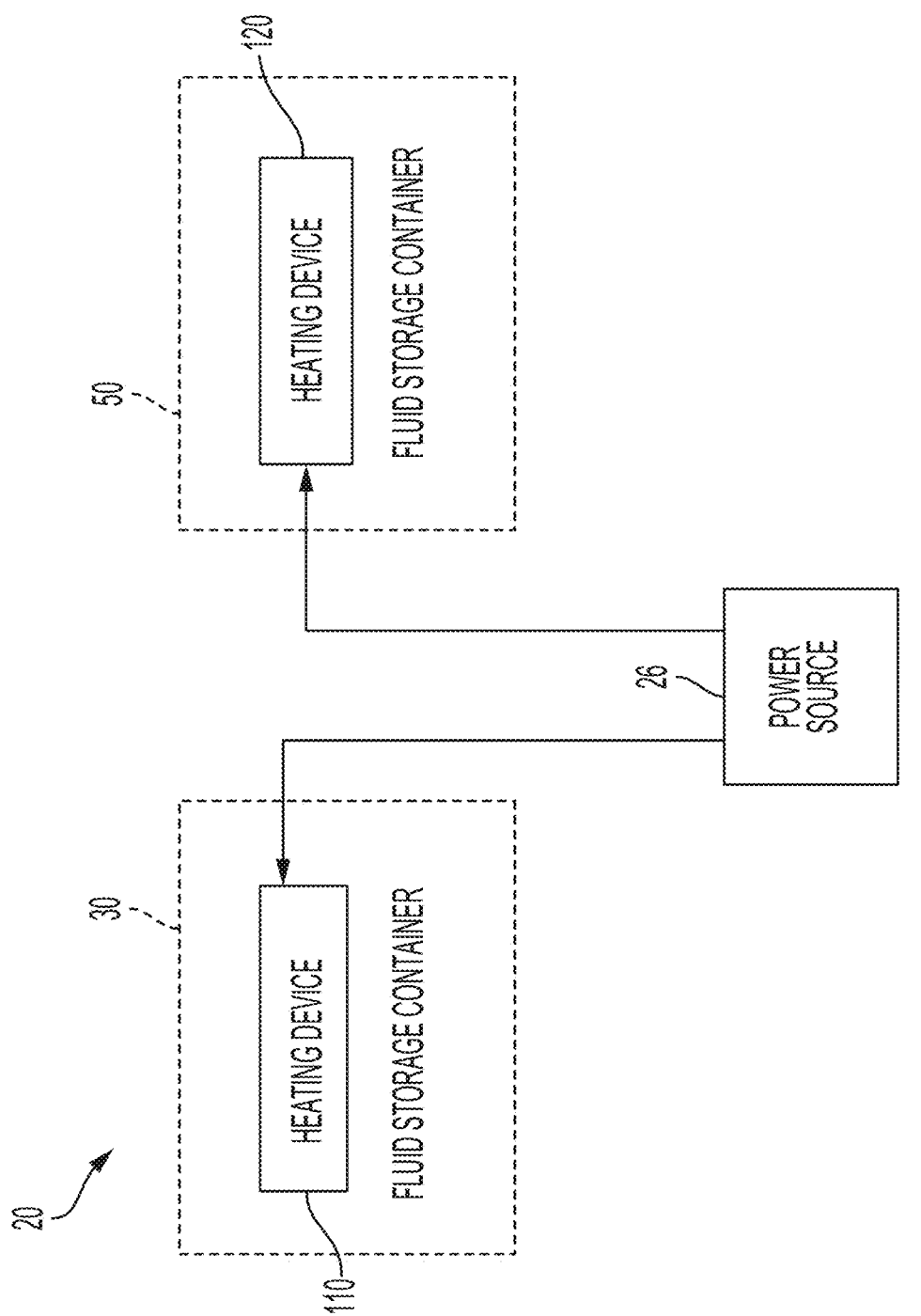
FIG. 7 illustrates a fluid heating system of the mobile fluid transfer system of FIG. 2 in accordance with at least one aspect of the present disclosure.

FIG. 7 illustrates a fluid heating system 20 of the mobile fluid transfer system 10 of FIG. 2 in accordance with at least one aspect of the present disclosure. The fluid heating system 20 comprises a heating device 110 and a heating device 112. The heating device 110 is positioned within the fluid storage container 30 and is utilized to heat the fluid of a given zone of the fluid storage container 30 to a predetermined temperature. Similarly, the heating device 112 is positioned within the fluid storage container 50 and is utilized to heat the fluid of a given zone of the fluid storage container 50 to a predetermined temperature. According to various aspects, one of the heating device 110 and the heating device 112 may operate to heat the fluid of a given zone of the fluid storage container 30 as well as the fluid of a given zone of the fluid storage container 50 to a predetermined temperature. The predetermined temperature associated with the heating device 110 can be the same as or different from the predetermined temperature associated with the heating device 112. According to various aspects, the heating devices 110, 112 are resistive heating elements, and the electrical power provided to the heating devices 110, 112 is controlled by the control circuit 18 based on signals output by the seventh and eighth sensing devices 102, 104 to maintain predetermined temperature levels within the given zones of the fluid storage containers 30, 50. For instances where heating is needed to achieve sufficient flow of the fluids, by only heating respective zones of the fluid storage containers 30, 50, the entirety of the fluids in the fluid storage containers 30, 50 are only partially heated (all of the fluid isn't necessarily heated to the predetermined temperature). This can allow for the flow of the fluids to be realized faster than would otherwise be possible. Electrical power to the first and second heating devices 102, 104 can be provided by the power source 26, by the wheeled vehicle which transports the mobile fluid transfer system 10 to the remote job site, from a machine being serviced by the mobile fluid transfer system 10, or from an AC power source which is external to the mobile fluid transfer system 10. According to other aspects, the heating devices 110, 112 are flow type heaters which utilize an enclosed circulating liquid to heat the fluid of a given zone of the fluid storage container 30 as well as the fluid of a given zone of the fluid storage container 50 to a predetermined temperature.

According to various aspects, the heating devices 110, 112 include sensing devices which measure the temperature of the heating elements of the heating devices 110, 112. For such aspects, the seventh and eighth sensing devices 102, 104 are utilized to determine the temperatures of the respective fluids in the fluid storage containers 30, 50. If the temperature of fluid in the fluid storage container 30 is below a pre-determined threshold, the control circuit 18 turns on the heating device 110. Similarly, if the temperature of fluid in the fluid storage container 50 is below the pre-determined threshold, the control circuit 18 turns on the heating device 112. The pre-determined threshold for the fluid in the fluid storage container 30 can be the same as or different from the pre-determined threshold for the fluid in the fluid storage container 50. The control circuit 18 also monitors the temperature of the heating elements of the heating devices 110, 112, and when a temperature of a heating element reaches a pre-determined upper threshold, the control circuit 18 shuts off the heating device 110, 112 associated with the heating element. The pre-determined upper threshold for the heating element of the heating device 110 can be the same as or different from the pre-determined upper threshold for the heating element for the heating device 112. As the heating element cools, the control circuit 18 continues the monitoring and when the temperature of the heating element hits a pre-determined lower threshold, the control circuit 18 turns the heating device 110, 112 associated with the heating element back on. The pre-determined lower threshold for the heating element of the heating device 110 can be the same as or different from the pre-determined lower threshold for the heating element of the heating device 112. The above-described process continues until the fluid temperatures measured by the seventh and eighth sensing devices 102, 104 reach their respective pre-determined thresholds, a temperature at which fluids no longer need to be heated.

Figure 8:
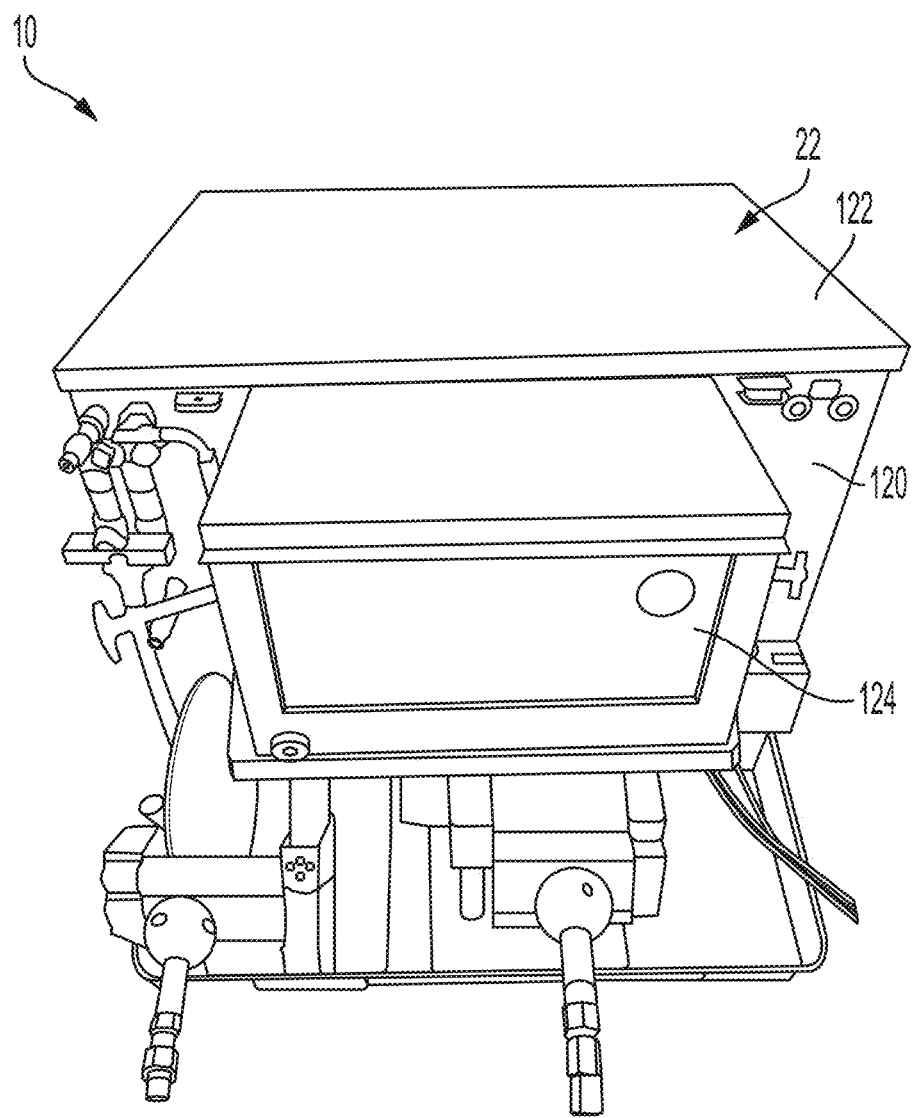
FIG. 8 illustrates a fluid containment system of the mobile fluid transfer system of FIG. 2 in accordance with at least one aspect of the present disclosure.

FIG. 8 illustrates a fluid containment system 22 of the mobile fluid transfer system 10 of FIG. 2 in accordance with at least one aspect of the present disclosure. The fluid containment system 22 surrounds the fluid storage containers 30, 50 and may be of any suitable size and shape. For example, according to various aspects, the fluid containment system 22 is sized to be able to hold at least 100% of the combined capacity of the fluid storage containers 30, 50. According to other aspects, the fluid containment system 22 is sized to be able to hold up to 120% (e.g., 105%, 110%, 115%, etc.) of the combined capacity of the fluid storage containers 30, 50. Stated differently, for this example, if the combined capacity of the fluid storage container 30 and the fluid storage container 50 is 100 gallons, the fluid containment system 22 may be sized to hold up to 120 gallons of fluid. In this manner, even if both of the fluid storage containers 30, 50 were to fail, the fluid containment system 22 could safely hold all of the fluid from the storage containers plus 20 gallons of any additional fluid (e.g., rainwater). According to yet other aspects, the fluid containment system 22 is sized to be able to hold more than 120% (e.g., 125%, 130%, 140%, 150%) of the combined capacity of the fluid storage containers 30, 50.

According to other aspects, the fluid containment system 22 may be configured to hold at least 100% of the individual capacity of the fluid storage container 30 or the fluid storage container 50, whichever is greater. When the mobile fluid transfer system 10 arrives at the first remote job site of a given day, the fluid storage container 50 holds a certain amount of fluid (e.g., new oil) and the fluid storage container 30 may be empty or nearly empty. As the first machine is serviced, the fluid evacuation system 12 operates to evacuate a fluid (e.g., waste oil) from the machine and deliver the evacuated fluid into the fluid storage container 30, thereby increasing the amount of fluid in the fluid storage container 30. Once the evacuation process is completed, the fluid refill system 14 may then be operated to deliver the fluid (e.g., new oil) from the fluid storage container 50 to the machine, thereby decreasing the amount of fluid in the fluid storage container 50. For instances where the amount of fluid delivered from the fluid storage container 50 to the machine is the same as the amount of fluid evacuated from the machine and delivered into the fluid storage container 30, the combined amount of the fluids in the fluid storage containers 30, 50 is the same at the end of the service operation as it was at the beginning of the service operation. This process may be repeated for any number of machines being serviced such that when the mobile fluid transfer system 10 leaves the first remote job site, the combined amount of the fluids in the fluid storage containers 30, 50 is the same as it was when the mobile fluid transfer system 10 arrived at the first remote job site. For these aspects, the fluid containment system 22 is able to safely hold at least 100% of the sum of the fluids from the storage container 30 and the storage container 50 while the mobile fluid storage system 10 is in transit. According to other aspects, the fluid containment system 22 is sized to be able to hold up to 120% (e.g., 105%, 110%, 115%, etc.) of the individual capacity of the fluid storage container 30 or the fluid storage container 50, whichever is greater, thereby providing a safety factor in case there are any additional fluid or fluids other than the waste oil or the new oil present in the fluid storage containers 30, 50. According to yet other aspects, the fluid containment system 22 is sized to be able to hold more than 120% (e.g., 125%, 130%, 140%, 150%) of the individual capacity of the fluid storage container 30 or the fluid storage container 50, whichever is greater.

For the aspect shown in FIG. 8, the fluid containment system 22 is rectangular shaped and includes a bottom or floor (not visible), four side walls 120 (left side, right side, front and rear) and a movable top 122. The bottom/floor, the four side walls 120 and the movable top 122 may be fabricated from any suitable material. For example, according to various aspects, at least one of the bottom/floor, the four side walls 120 and the movable top 122 is fabricated from a metal such as a steel (e.g., plate steel), an aluminum, etc. According to other aspects, at least one of the bottom/floor, the four side walls 120 and the movable top 122 is fabricated from a fiberglass, a plastic, a composite, etc. According to various aspects, the fluid containment system 22 utilizes a floor of the mobile fluid transfer system 10 as the bottom/floor of the fluid containment system 22. According to other aspects, the bottom/floor of the fluid containment system 22 is separate from and above the floor of the mobile fluid transfer system 10. The four side walls 120 are coupled to the bottom/floor of the fluid containment system 22 and to their adjacent side walls 120 in a manner (e.g., welded) which provides a "watertight" seal such that any fluid which is in contact with the bottom/floor of the fluid containment system 22 and the four side walls 120 (up to a certain height) is prevented from leaking out of the fluid containment system 22 (as long as the mobile fluid transfer system 10 is in the "upright" position). The movable top 102 can be lifted off (either partially via hinges or fully) to provide access to the internal volume of the fluid containment system 22.

In addition to surrounding the fluid storage containers 30, 50, the fluid containment system 22 also surrounds other portions of the fluid evacuation system 12 (e.g., the piping 32, the air vent 72, the first sensing device 90, the third sensing device 94, the fifth sensing device 98, the seventh sensing device 102 and the one or more sensing devices 106) and other portions of the fluid refill system 14 (e.g., the piping 52, the air vent 72, the second sensing device 92, the fourth sensing device 96, the fifth sensing device 98, and the eighth sensing device 104). The fluid containment system 22 also surrounds portions of the control circuit 18, including power wiring and control wiring.

According to various aspects, the fluid containment system 22 also includes an insulative material and/or a fire retardant material which surrounds the fuel storage containers 30, 50. The insulative material provides a temperature buffer which helps to retain heat within the interiors of the fluid storage containers 30, 50. The fire retardant material provides fire suppression, and operates as a barrier to keep heat and/or flames external to the fluid storage containers 30, 50 from introducing heat and/or damage to the interior of the fluid storage containers 30, 50, thereby reducing the possibility of such external heat damaging or compromising the interiors of the fluid storage containers 30, 50.

According to other aspects of the fluid containment system 22, any of the bottom/floor, the side walls 120 and the top 122 may be double-walled, the top 122 may be fixed in place in lieu of being movable, and the shape of the fluid containment system 22 may be a shape other than rectangular. For example, the fluid containment system 22 may include at least one curved surface.

As also shown in FIG. 8, according to various aspects, the mobile fluid transfer system 10 may further comprise a filter storage compartment 124. The filter storage compartment 124 may be utilized to store filters which have been removed from various machines during service operations. The filter storage compartment 124 may be constructed in a manner similar to the fluid containment system 22, and may be waterproof up to a certain height of the filter storage compartment 124. The filter storage compartment 124 provides a convenient location to store the removed filters (and any debris/oil still in the filters) so as to avoid any unintended environmental issues associated with the removed filters. The filters can be subsequently removed and properly processed for disposal at a later point in time (e.g., when the mobile fluid transfer system 10 arrives at a service station, a repair shop or back at a home base). According to various aspects, the filter storage compartment 124 includes plug which allows for the fluid storage compartment 124 to be manually drained of any fluids. According to other aspects, the mobile fluid transfer system 10 may be configured to evacuate fluid from the filter storage compartment 124 and deliver the evacuated fluid into the fluid storage container 30.

Figure 9:
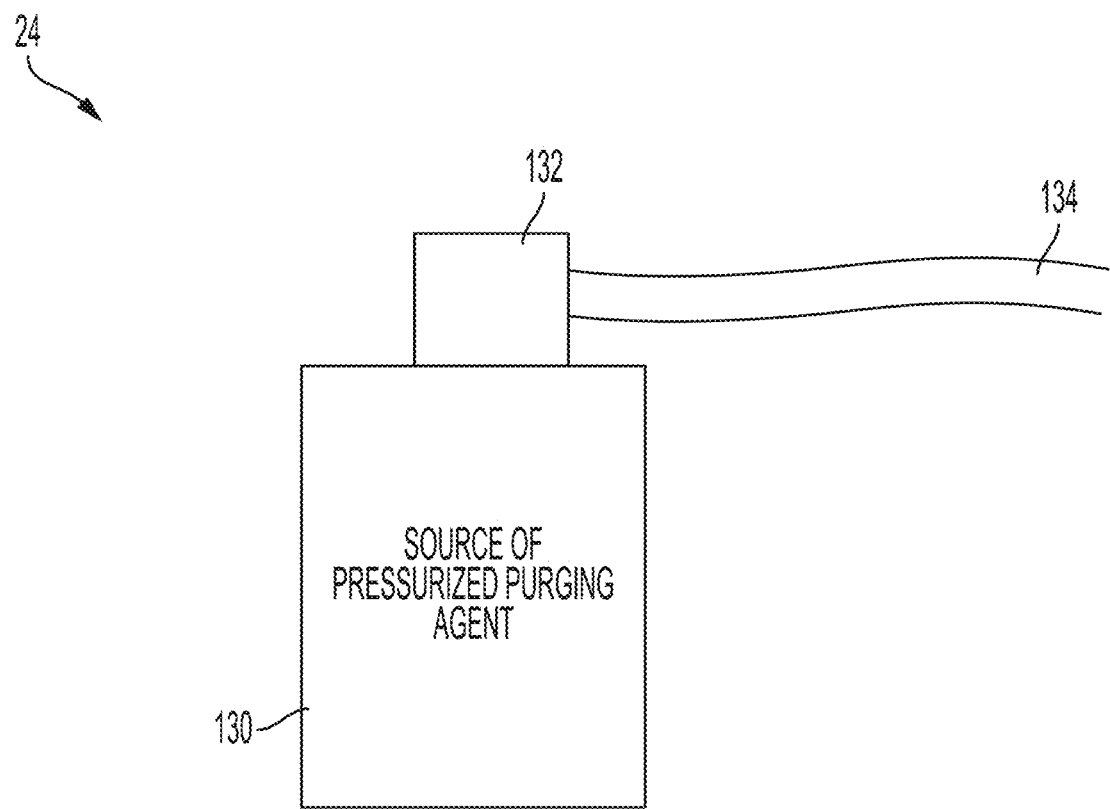
FIG. 9 illustrates a purge system of the mobile fluid transfer system of FIG. 2 in accordance with at least one aspect of the present disclosure.

FIG. 9 illustrates a purge system 24 of the mobile fluid transfer system 10 of FIG. 2 in accordance with at least one aspect of the present disclosure. According to various aspects, the purge system 24 includes a source 130 of a pressurized purging agent (e.g., air, nitrogen, carbon dioxide, other gases, etc.), a shut-off valve 132, hosing 134 connected to the shut-off valve 132, and a fitting 136 (e.g., a quick connect fitting) coupled to an end of the hosing 134. The shut-off valve 132 can be utilized to stop the flow of the purging agent to the earth moving machine. According to various aspects, the shut-off valve 132 is operated manually. According to other aspects, the shut-off valve 132 is a solenoid valve which is controlled automatically by the control circuit 18. For such aspects, the purge system 24 is coupled to the control circuit 18. The hosing 134 is wound on a hose reel (not shown) which is similar to the hose reels shown in FIG. 8, is wound in a manner similar to the hosing 36 of the fluid evacuation system 12 and the hosing 60 of the fluid refill system 14, and can be extended to reach the earth moving machine. The hosing 134 may be of any suitable length and any suitable diameter. For example, according to various aspects, the hosing 134 may be 50 feet in length, 75 feet in length or 100 feet in length, and may have a diameter of ⅜", ½", ⅝" or ¾". The fitting 136 may be coupled directly to a valve assembly (e.g., a quick fit valve assembly) which is connected directly to the earth moving machine. By utilizing the source 130 of the pressurized purging agent to apply a positive pressure to the valve assembly, the valve assembly operates to allow the pressurized purging agent to be delivered to the earth moving machine, where the pressurized purging agent acts to dislodge and remove any trapped particulate or oil from the filter (or filters) of the earth moving machine, thereby allowing for the dislodged particulate or oil to be subsequently removed from the machine during an evacuation process. The use of the purge system 24 also operates to lower the temperature of the filter. For instances where the filter is to be removed and replaced, the filter to be removed is at a lower temperature and contains less liquid waste as a result of the purging, thereby mitigating the risk of burns and oil spills which can occur during the removal of the filter. For instances where the filter is a reuseable filter, the purging returns the reuseable filter (or filters) to a like-new condition. When the purge system 24 is utilized in conjunction with the fluid evacuation system 12 and the fluid refill system 14 for an oil service operation performed on a given machine, approximately 10% more "waste oil" is removed from the machine by the fluid evacuation system 12, resulting in less cross-contamination of the new oil delivered to the machine by the fluid refill system 14.

Figure 10:
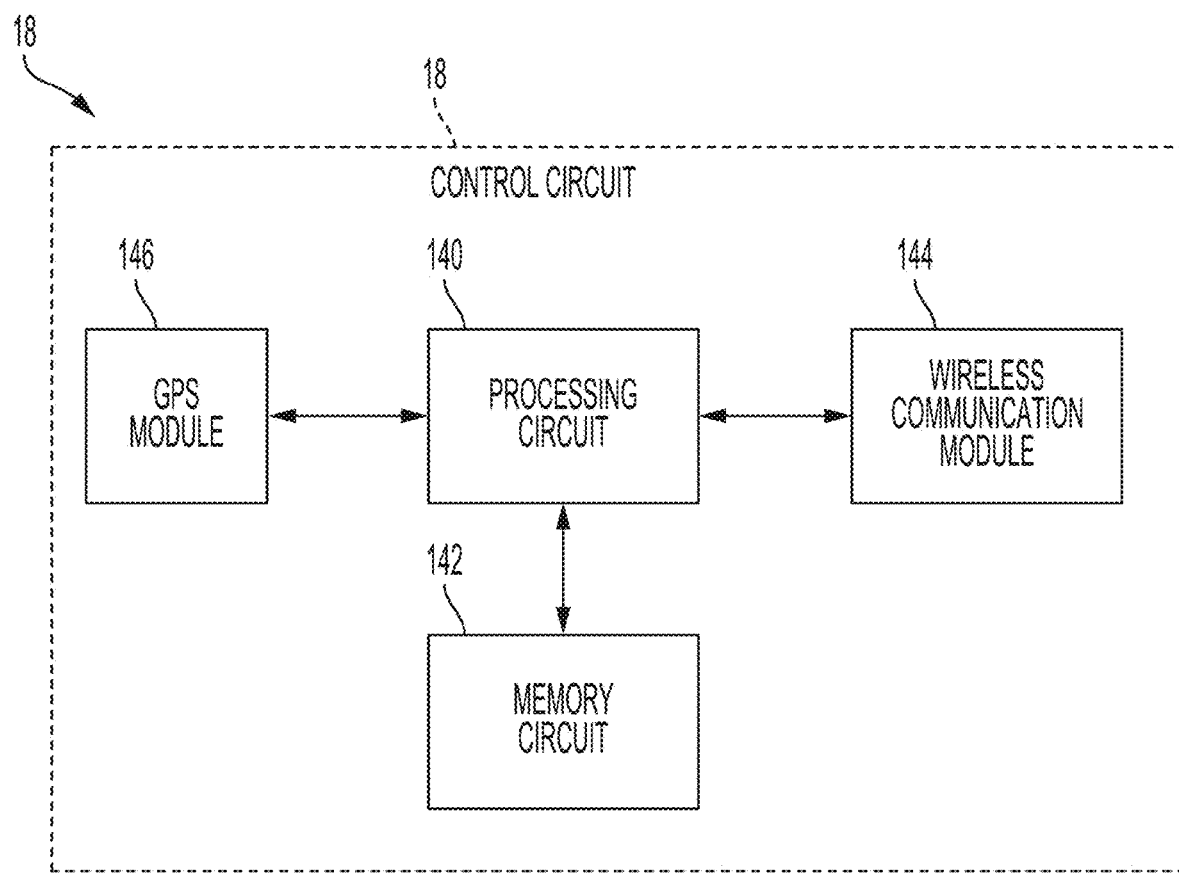
FIG. 10 illustrates a control circuit of the mobile fluid transfer system of FIG. 2 in accordance with at least one aspect of the present disclosure.

FIG. 10 illustrates a control circuit 18 of the mobile fluid transfer system 10 of FIG. 2 in accordance with at least one aspect of the present disclosure. The control circuit 18 includes a processing circuit 140, a memory circuit 142 and a wireless or cellular communication module 144. According to various aspects, the control circuit 18 also includes a global positioning system (GPS) module 146. Also, according to various aspects, the control circuit also includes the power source 26. As shown in FIG. 2, the control circuit 18 is coupled to fluid refill system 14 and to the sensing system 16. According to various aspects, the control circuit 18 is also coupled to the fluid evacuation system 12, the fluid heating system 20, the purge system 24 and a power source (e.g., the power source 26 or a power source external to the mobile fluid transfer system 10). According to various aspects, when AC power is coupled to the mobile fluid transfer system 10, the control circuit 18 and the heating devices 110, 112 are powered by AC power. If no AC power is coupled to the mobile fluid transfer system 10, the control circuit 18 is powered by DC power.

The processing circuit 140 may be, for example, hard-wired circuitry, programmable circuitry (e.g., a computer processor including one or more individual instruction processing cores, processing unit, processor, microcontroller, microcontroller unit, controller, digital signal processor (DSP), programmable logic device (PLD), programmable logic array (PLA), or field programmable gate array (FPGA)), state machine circuitry, firmware that stores instructions executed by programmable circuitry, and any combination thereof. The processing circuit 140 may, collectively or individually, be embodied as circuitry that forms part of a larger system, for example, an integrated circuit (IC), an application-specific integrated circuit (ASIC), a system on-chip (SoC), desktop computers, laptop computers, tablet computers, servers, smart phones, etc. Accordingly, the processing circuit 140 may include, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of random access memory), and/or electrical circuitry forming a communications device (e.g., a modem, communications switch, or optical-electrical equipment). Those having skill in the art will recognize that the subject matter described herein may be implemented in an analog or digital fashion or some combination thereof.

The memory circuit 142 is coupled to the processing circuit 140 and may include more than one type of memory. For example, according to various aspects, the memory 142 circuit may include volatile memory and non-volatile memory. The volatile memory can include random access memory (RAM), which can act as external cache memory. According to various aspects, the random access memory can be static random access memory (SRAM), dynamic random access memory (DRAM), synchronous dynamic random access memory (SDRAM), double data rate synchronous dynamic random access memory (DDR SDRAM), enhanced synchronous dynamic random access memory (ESDRAM), Synchlink dynamic random access memory (SLDRAM), direct Rambus random access memory (DR-RAM) and the like. The non-volatile memory can include read-only memory (ROM), programmable read-only memory (PROM), electrically programmable read-only memory, electrically erasable programmable read-only memory (EEPROM), flash memory and the like. According to various aspects, the memory circuit 142 can also include removable/non-removable, volatile/non-volatile storage media, such as for example disk storage. The disk storage can include, but is not limited to, devices like a magnetic disk drive, a floppy disk drive, a tape drive, a Jaz drive, a Zip drive, a LS-60 drive, a flash memory card, or a memory stick. In addition, the disk storage can include storage media separately or in combination with other storage media including, but not limited to, an optical disc drive such as a compact disc ROM device (CD-ROM), a compact disc recordable drive (CD-R Drive), a compact disc rewritable drive (CD-RW Drive), a digital versatile disc ROM drive (DVD-ROM) and the like.

The wireless communication module 144 is configured to enable communication between the mobile fluid transfer system 10 and other devices/systems via a network 152 (See FIG. 11), where the communications between the wireless communications module 144 and the network 152 are wireless communications. With this capability, the mobile fluid transfer system 10 is able to receive information/instructions/commands from devices which are proximate to the mobile fluid transfer system 10, as well as communicate information associated with the mobile fluid transfer system 10 to systems which are remote from the mobile fluid transfer system 10. For example, according to various aspects, as explained in more detail hereinbelow, the mobile fluid transfer system 10 can be controlled by a wireless controller, and can automatically send reports to one or more remote computing systems.

The wireless communication module 144 can employ any suitable wireless communication technology. For example, according to various aspects, the wireless communication module 144 can employ, Bluetooth, Z-Wave, Thread, Zig-Bee, and the like. Similarly, the wireless communication module 144 can employ any one of a number of wireless communication standards or protocols, including but not limited to Wi-Fi (IEEE 802.11 family), WPA2, WPA3, WiMAX (IEEE 802.16 family), IEEE 802.20, long-term evolution (LTE), and Ev-DO, HSPA+, HSDPA+, HSUPA+, EDGE, GSM, GPRS, CDMA, TDMA, DECT, and Ethernet derivatives thereof, as well as any other wireless protocols that are designated as 3G, 4G, 5G, and beyond.

According to various aspects, the GPS module 146 is configured to receive information communicated from a plurality of GPS satellites and/or ground GPS stations, and utilize the information to determine its location, and by extension, the location of the mobile fluid transfer system 10. The location information can be stored in the memory circuit 142 and communicated to any device, computing system and the like which is connected to the network 152.

In general, as described in more detail hereinbelow, the control circuit 18 is configured to control the operation of the mobile fluid transfer system 10, receive information/instructions/commands from devices and/or systems which are external to the mobile fluid transfer system 10, and communicate information to devices and/or systems which are external to the mobile fluid transfer system 10. Such devices may include, for example, a wireless controller.

According to various aspects, the control circuit 18 is configured to receive a signal output by the first sensing device 90, temporarily store the received signal in the memory circuit 142, and utilize the stored signal to determine the amount of fluid in the fluid storage container 30. For example, according to various aspects, the fluid storage container 30 is rectangular shaped, having a length of 4 feet, a width of 2 feet and a height of 3 feet, and the control circuit 18 is pre-programmed to know these dimensions. Thus, the control circuit 18 can easily calculate, or be pre-programmed to know, that the cross-sectional area of the fluid storage container 30 is 8 square feet. Therefore, once the height of the fluid (e.g., a distance from the floor of the fluid storage container 30 to the top of the waste oil) is determined, the control circuit 18 can determine the amount (or volume) of the fluid in the fluid storage container 30. The control circuit can determine the amount in gallons, quarts, liters and the like. When a signal (e.g., an ultrasound pulse, a pulse of light, a microwave, etc.) travels from the sensing device 90 to the "top" of the waste oil and back to the sensing device 90, the sensing device 90 is configured to measure the time of travel and output a signal indicative of the measured time of travel to the control circuit 18. The control circuit 18 can utilize the signal from the first sensing device 90 to determine a distance between the top of the waste oil and the top of the fluid storage container 30 and by extension, the height of the waste oil from the floor of the storage to the top of the waste oil. The control circuit 18 may then simply calculate the amount of fluid in the fluid storage container 30 by multiplying the cross-sectional area of the fluid storage container 30 (8 square feet) by the determined height of the fluid in the fluid storage container 30. Alternatively, the control circuit 18 can also just simply multiply the known length (4 feet) by the known width (2 feet) by the determined height. The above-described calculations, or like calculations, can be performed to determine an amount of fluid in the fluid storage container in real time (or in near-real time), and can be performed any number of times. According to other aspects, the control circuit 18 can determine the amount of fluid (e.g., waste oil) in the fluid storage container 30 using the methodology described with reference to FIG. 6A.

Similarly, according to various aspects, the control circuit 18 is also configured to receive a signal output by the second sensing device 92, temporarily store the received signal in the memory circuit 142, and utilize the stored signal to determine the amount of fluid in the fluid storage container 50 in the same manner as described above.

According to various aspects, the control circuit 18 is further configured to receive signals output by the first and second sensing devices 90, 92, temporarily store the received signals in the memory circuit 142, and utilize the stored signals to determine whether the level of the either of the fluids in the fluid storage containers 30, 50 have reached respective predetermined thresholds. In the context of the fluid storage container 30, the predetermined threshold can represent a level indicating that the waste oil is getting close to filling the fluid storage container 30, and it is time to stop receiving waste oil. The waste oil can subsequently be removed from the fluid storage container 30. For example, according to various aspects, the predetermined threshold for the waste oil may be set as an amount (e.g., a certain number of gallons), a height of the fluid (e.g., 2 feet, 8 inches), a percentage of the overall volume of the fluid storage container 30 (e.g., 90% of 24 cubic feet), a percentage of the overall height of the fluid storage container 30 (e.g., 90% of 3 feet) and the like. Similarly, in the context of the fluid storage container 50, the predetermined threshold can represent a level indicating that the new oil in the fluid storage container 50 is getting close be being empty, and it is time to stop supplying the new oil. Additional new oil can subsequently be added to refill the fluid storage container 50. For example, according to various aspects, the predetermined threshold for the new oil may be set as an amount (e.g., a certain number of gallons), a height of the fluid (e.g., 4 inches), a percentage of the overall volume of the fluid storage container 50 (e.g., 10% of 24 cubic feet), a percentage of the overall height of the fluid storage container 50 (e.g., 10% of 3 feet) and the like.

By knowing the amounts of the fluids in the fluid storage containers 30, 50, the height of the fluids in the fluid storage containers 30, 50, and the empty or unused height of the fluid storage containers 30, 50 from the above-described methods, the control circuit 18 can readily determine whether or not either of the respective predetermined thresholds has been reached based on the signals received from the first and second sensing devices 90, 92. For instances where the predetermined threshold is set in different units (e.g., as a percentage), the control circuit 18 is configured to utilize the above described calculations to perform additional straight-forward calculations to determine whether or not the predetermined threshold has been reached (or exceeded). According to other aspects, the control circuit 18 can determine whether or not the predetermined threshold has been reached (or exceeded) based on the signals output by the first and second sensing devices 90, 92 as described with reference to FIG. 6.

According to various aspects, based on the above-described calculations associated with the signals from the first and second sensing devices 90, 92, the control circuit 18 is further configured to calculate/determine the following: (1) the amount (e.g. gallons) of fluid in the fluid storage container 30 before and after the performance of each machine service operation (e.g., a fluid evacuation), (2) the amount (e.g., gallons) of fluid pumped into the fluid storage container 30 for each machine service operation, (3) the amount (e.g. gallons) of fluid in the fluid storage container 30 before and after a removal operation is performed on the fluid storage container 30, (4) the amount (e.g. gallons) of fluid in the fluid storage container 50 before and after a refill operation is performed on the fluid storage container 50, (5) the amount (e.g. gallons) of fluid in the fluid storage container 50 before and after the performance of each machine service operation (e.g., a fluid refill) and (6) the amount (e.g., gallons) of fluid pumped out of the fluid storage container 50 for each machine service operation. Of course, similar calculations/determinations can be made for associated milestones such as, for example, fluid levels at the start of work day, fluid levels upon arrival and exit of each different jobsite, fluid levels at end of the day, and the like. All of the above information can be stored in the memory circuit 142 and communicated to any device, computing system and the like which is connected to the network 152.

According to various aspects, the control circuit 18 is configured to receive a signal output by the third sensing device 94, temporarily store the received signal in the memory circuit 142, and utilize the stored signal to determine whether a level of the fluid in the fluid storage container 30 has reached (or exceeded) a predetermined threshold. In the context of the fluid storage container 30, the predetermined threshold can represent a level indicating that the waste oil is getting close to filling the fluid storage container 30, and it is time to stop receiving waste oil. For example, according to various aspects, the third sensing device 94 is positioned based on the predetermined threshold. If the fluid level is below the position measured by the third sensing device 94, the third sensing device 94 outputs a first signal indicative of the fluid level not having reached the predetermined threshold. However, if the fluid level reaches the position measured by the third sensing device 94, the third sensing device 94 outputs a second signal indicative of the fluid level having reached the predetermined threshold. When the control circuit 18 processes the first signal, the control circuit 18 determines the level of fluid in the storage container 30 has not reached the predetermined threshold and does not take any action. However, when the control circuit 18 processes the second signal, the control circuit 18 determines the level of fluid in the storage container 30 has reached the predetermined threshold. Responsive thereto, the control circuit 18 may take further action such as, for example, disconnecting electrical power from a pump associated with the fluid evacuation system 12, closing off the shut-off valve 34, initiating an audible alarm, initiating a visual alarm and/or communicating a notification to one or more devices, computing systems and the like which are connected to the network 152.

Similarly, according to various aspects, the control circuit 18 is also configured to receive a signal output by the fourth sensing device 96, temporarily store the received signal in the memory circuit 142, and utilize the stored signal to determine whether a level of the fluid in the fluid storage container 50 has reached (or exceeded) a predetermined threshold. In the context of the fluid storage container 50, the predetermined threshold can represent a level indicating that the new oil in the fluid storage container 50 is getting close be being empty, and it is time to stop supplying the new oil. For example, according to various aspects, the fourth sensing device 96 is positioned based on the predetermined threshold. If the fluid level is above the position measured by the fourth sensing device 96, the fourth sensing device 96 outputs a first signal indicative of the fluid level not having dropped down to the predetermined threshold. However, if the fluid level reaches or drops below the position measured by the fourth sensing device 96, the fourth sensing device 96 outputs a second signal indicative of the fluid level having reached or dropped below the predetermined threshold. When the control circuit 18 processes the first signal, the control circuit 18 determines the level of fluid in the storage container 30 has not dropped down to the predetermined threshold and does not take any action. However, when the control circuit 18 processes the second signal, the control circuit 18 determines the level of fluid in the storage container 30 has reached or dropped below the predetermined threshold. Responsive thereto, the control circuit 18 may take further action such as, for example, disconnecting electrical power from the pump 58 of the fluid refill system 14, closing off the shut-off valve 54, initiating an audible alarm, initiating a visual alarm and/or communicating a notification to one or more devices, computing systems and the like which are connected to the network 152. All of the above information can be stored in the memory circuit 142 and communicated to any device, computing system and the like which is connected to the network 152.

In certain aspects, the above-described determination made by the control circuit 18 based on signals received from the third and fourth sensing devices 94, 96 can provide redundancy to the predetermined threshold determinations made by the control circuit 18 based on signals received from the first and second sensing devices 90, 92.

According to various aspects, the control circuit 18 is configured to receive a signal output by the fifth sensing device 98, temporarily store the received signal in the memory circuit 142, and utilize the stored signal to determine whether the mobile fluid storage system 10 and/or the fluid storage containers 30, 50 are oriented in position other than an upright position. For example, according to various aspects, the fifth sensing device 98 is configured to output a signal indicative of the orientation of the mobile fluid storage system 10 and/or the fluid storage containers 30, 50. If the mobile fluid storage system 10 and/or the fluid storage containers 30, 50 are oriented in the upright position, the fifth sensing device 98 outputs a first signal indicative of the mobile fluid storage system 10 and/or the fluid storage containers 30, 50 being in the upright position. However, if the mobile fluid storage system 10 and/or the fluid storage containers 30, 50 are oriented in a position other than the upright position, the fifth sensing device 98 outputs a second signal indicative of the mobile fluid storage system 10 and/or the fluid storage containers 30, 50 being in a position other than the upright position. Stated differently, the second signal is indicative of a rollover condition. When the control circuit 18 processes the first signal, the control circuit 18 determines the mobile fluid storage system 10 and/or the fluid storage containers 30, 50 are in the upright position (they have not rolled over) and does not take any action. However, when the control circuit 18 processes the second signal, the control circuit 18 determines the mobile fluid storage system 10 and/or the fluid storage containers 30, 50 are in not in the normal upright position (they have rolled over, either onto their side or upside down). Responsive thereto, the control circuit 18 may take further action such as, for example, disconnecting electrical power from a pump associated with the fluid evacuation system 12, disconnecting electrical power from the pump 58 of the fluid refill system 14, closing off the shut-off valve 34, closing off the shut-off valve 54, initiating an audible alarm, initiating a visual alarm and/or communicating a notification to one or more devices, computing systems and the like which are connected to the network 152. All of the above information can be stored in the memory circuit 142 and communicated to any device, computing system and the like which is connected to the network 152.

According to various aspects, the control circuit 18 is configured to receive a signal output by the sixth sensing device 100, temporarily store the received signal in the memory circuit 142, and utilize the stored signal to determine whether fluid is present proximate a floor of the fluid containment system 22 and external to the fluid storage containers 30, 50. For example, according to various aspects, the sixth sensing device 100 is configured to output a first signal indicative of the lack of a presence of fluid proximate the floor of the fluid containment system 22 and external to the fluid storage containers 30, 50, and is also configured to output a second signal indicative of the presence of fluid proximate the floor of the fluid containment system 22 and external to the fluid storage containers 30, 50. The presence of fluid is indicative of a leak or a spill. Thus, the second signal is indicative of a spill or leak having occurred. If the sixth sensing device 100 does not sense the presence of fluid proximate the floor of the fluid containment system 22 and external to the fluid storage containers 30, 50, the sixth sensing device 100 outputs the first signal. However, if the sixth sensing device 100 senses the presence of fluid proximate the floor of the fluid containment system 22 and external to the fluid storage containers 30, 50, the sixth sensing device 100 outputs the second signal. When the control circuit 18 processes the first signal, the control circuit 18 determines no fluid has leaked or spilled from the fluid storage containers 30, 50 and/or any piping positioned within the fluid containment system 22, and the control circuit 18 does not take any action in response thereto. However, when the control circuit 18 processes the second signal, the control circuit 18 determines fluid has leaked or spilled from the fluid storage containers 30, 50 and/or any piping positioned within the fluid containment system 22. Responsive thereto, the control circuit 18 may take further action such as, for example, disconnecting electrical power from a pump associated with the fluid evacuation system 12, disconnecting electrical power from the pump 58 of the fluid refill system 14, disconnecting electrical power from the heating devices 110, 112, closing off the shut-off valve 34, closing off the shut-off valve 54, initiating an audible alarm, initiating a visual alarm and/or communicating a notification to one or more devices, computing systems and the like which are connected to the network 152. All of the above information can be stored in the memory circuit 142 and communicated to any device, computing system and the like which is connected to the network 152.

According to various aspects, the control circuit 18 is configured to receive a signal output by the seventh sensing device 102, temporarily store the received signal in the memory circuit 142, and utilize the stored signal to control operation of the heating device 110. For example, according to various aspects, the seventh sensing device 102 is configured to measure a temperature of the fluid in a given zone of the fluid storage container 30, and output a signal which indicative of the measured temperature. The heating device 110 is utilized to heat the fluid of a given zone of the fluid storage container 30 to a predetermined temperature. The predetermined temperature may be stored in the memory circuit 142. The control circuit 18 is further configured to determine the temperature of the fluid based on the output signal of the seventh sensing device 102, compare the determined temperature to the predetermined temperature, and control the heating device 110 accordingly. For example, if the measured temperature is the same as or greater than the predetermined temperature, the control circuit 18 operates to disconnect electrical power to the heating device 110, thereby preventing the fluid in the fluid storage container 30 from being heated by the heating device 110. However, if the measured temperature is less than the predetermined temperature, the control circuit 18 operates to connect electrical power to the heating device 110, thereby allowing the fluid in the fluid storage container 30 to be heated by the heating device 110. Once the fluid in the fluid storage container 30 is heated to the predetermined temperature, the control circuit 18 operates to disconnect electrical power to the heating device 110. For safety reasons, the control circuit 18 is configured to verify the fluid level in the fluid storage container 30 is higher than the height of the heating element of the heating device 110 in the fluid storage container 30 before allowing for the electrical power to be connected to the heating device 110.

Similarly, the control circuit 18 is configured to receive a signal output by the eighth sensing device 104, temporarily store the received signal in the memory circuit 142, and utilize the stored signal to control operation of the heating device 112. For example, according to various aspects, the eighth sensing device 104 is configured to measure a temperature of the fluid in a given zone of the fluid storage container 50, and output a signal which indicative of the measured temperature. The heating device 112 is utilized to heat the fluid of a given zone of the fluid storage container 50 to a predetermined temperature. The predetermined temperature may be stored in the memory circuit 142. The control circuit 18 is further configured to determine the temperature of the fluid based on the output signal of the eighth sensing device 104, compare the determined temperature to the predetermined temperature, and control the heating device 112 accordingly. For example, if the measured temperature is the same as or greater than the predetermined temperature, the control circuit 18 operates to disconnect electrical power to the heating device 112, thereby preventing the fluid in the fluid storage container 50 from being heated by the heating device 112. However, if the measured temperature is the less than the predetermined temperature, the control circuit 18 operates to connect electrical power to the heating device 112, thereby allowing the fluid in the fluid storage container 50 to be heated by the heating device 112. Once the fluid in the fluid storage container 50 is heated to the predetermined temperature, the control circuit 18 operates to disconnect electrical power to the heating device 112. For safety reasons, the control circuit 18 is configured to verify the fluid level in the fluid storage container 50 is higher than the height of the heating element of the heating device 112 in the fluid storage container 50 before allowing for the electrical power to be connected to the heating device 112.

The above-described determinations associated with the heating devices 110, 112 may be made any number of times. All of the determined temperatures, the respective times the determinations were made, the amount of time the heating devices 110, 112 were energized, etc. can be stored in the memory circuit 142 and communicated to any device, computing system and the like which is connected to the network 152.

According to various aspects, the control circuit 18 is configured to receive respective signals output by the one or more sensing devices 106, temporarily store the received signals in the memory circuit 142, and utilize the stored signals to determine parameters associated with fluid evacuated from a machine. The parameters are associated with a quality/condition of the fluid and can include, for example, degradation, contamination (e.g., fuel, coolant), acidity, water content, dilution, antioxidant depletion, metallic content, debris, soot, temperature, viscosity, particle count and the like for oil evacuated from the machine (i.e., waste oil). Thus, the control circuit 18 can also be considered to be configured to determine a quality/condition of the waste oil. For example, according to various aspects, the mobile fluid transfer system 10 can include an oil sampling apparatus which is configured to secure one or more samples of oil evacuated from the machine to allow for real time indications of any of the above-listed parameters. According to various aspects, the oil sampling apparatus can be pre-configured to assess for a plurality of combinations of parameters, values, elements, and the like associated with the evacuated oil.

For example, in various aspects, as fluid is evacuated from the earth moving machine and is being routed to the fluid storage container 30, the fluid may be captured and isolated, either inline (e.g., from the hosing 36) or via a separate branch line coupled to the hosing 36. The one or more sensing devices 106 measure various properties of the captured/isolated fluid (e.g., dielectric constant, inductive characteristics, optical properties, spectrographic characteristics, magnetic properties, etc.) and output signals indicative of the measurements. The control circuit 18 subsequently utilizes the output signals of the one or more sensing devices 106 to determine the parameters associated with the fluid. Such parameters may include, for example, an amount of fuel or glycol in the oil, a parts per million of wear metals in the oil, a particle count of larger contaminants in the oil, a viscosity of the oil, etc. The control system 18 may also then utilize the determined parameters to analyze a condition/quality of the fluid. All of the determined parameters, the respective times the determinations were made, the determined quality/condition of the fluid, etc. can be stored in the memory circuit 142 and communicated to any device, computing system and the like which is connected to the network 152.

According to various aspects, the control circuit 18 is configured to control the various pumps and valves of the mobile fluid transfer system 10. The pumps run on DC power and the valves are activated with DC power. The control circuit 18 provides against overfilling the fluid storage containers 30, 50 by allowing the fluid storage containers 30, 50 to be filled if the following two conditions are met. First, there are no leaks as indicated by sixth sensing device 100. Second, the fluid storage containers 30, 50 are not full as indicated, for example, by the first and second sensing devices 90, 92. As described in more detail hereinbelow, the control circuit 18 can operate in an automatic mode or a manual mode.

In the automatic mode, the wireless communication module 144 is configured to connect the wireless controller to an IP address of the mobile fluid transfer system 10 via Bluetooth, Wi-Fi or the like. When a person/service technician operates the wireless controller to communicate a fluid dispense request in units of gallons, quarts, liters and the like, the control circuit 18 receives the fluid dispense request and performs several checks/actions responsive thereto. First, the control circuit 18 determines whether the requested fluid amount is available. The control circuit 18 may utilize the output signals of the first and second sensing devices 90, 92 to make this determination. If the control circuit 18 determines the requested amount is not available, the control circuit 18 may record a log fault and communicate a fault signal to the wireless controller. Second, the control circuit 18 determines whether any leaks are present in the fluid refill system 14. The control circuit 18 may utilize the output signal of the sixth sensing device 100 to make this determination. If the control circuit 18 determines a leak has occurred, the control circuit 18 may record a log fault and communicate a fault signal to the wireless controller. Third, if the requested fluid amount is available and there are no leaks, the control circuit 18 may open the shutoff valve 54 if it isn't already open and activate the pump 58 to allow fluid to be pumped from the fluid storage container 50 to the earth moving machine. Fourth, the control circuit 18 monitors the flow of the fluid from the fluid storage container 50, and automatically closes the valve 58 and/or de-energizes the pump 58 once the requested fluid amount has been dispensed from the fluid storage container 50. The control circuit 18 may determine the requested fluid amount has been dispensed based on the output signals of the first and second sensing devices 90, 92. According to various aspects, the flow rate of the fluid may be controlled based on the temperature of the fluid, and the control circuit 18 can shut down the dispensing process if the flow rate is below a predetermined threshold. Fifth, the control circuit 18 records the volume of oil dispensed from the fluid storage container 50 and may also may also operate to capture data such as, for example, data regarding the evacuation event, the location of the event, timestamp information, fluid levels associated with the event and as well as a service set identifier (SSID) associated with a network coupled to the wireless device and the wireless communication module 144 of the mobile fluid transfer system 10.

With respect to the manual mode, when a person/service technician jogs or toggles a control button of the wireless controller, the control circuit 18 receives a jog/toggle request from the wireless controller, and the control circuit 18 jogs or toggles from the automatic mode to the manual mode. In the manual mode, as long as the control circuit 18 determines the requested fluid amount is available and no leaks are present, the fluid will be delivered from the fluid storage container 50 as long as the control button of the wireless controller is held down. If the control circuit 18 determines the requested fluid amount is not available or a leak is present, the control circuit 18 may record a log fault (or log faults) and communicate a fault signal (or fault signals) to the wireless controller.

Figure 11:
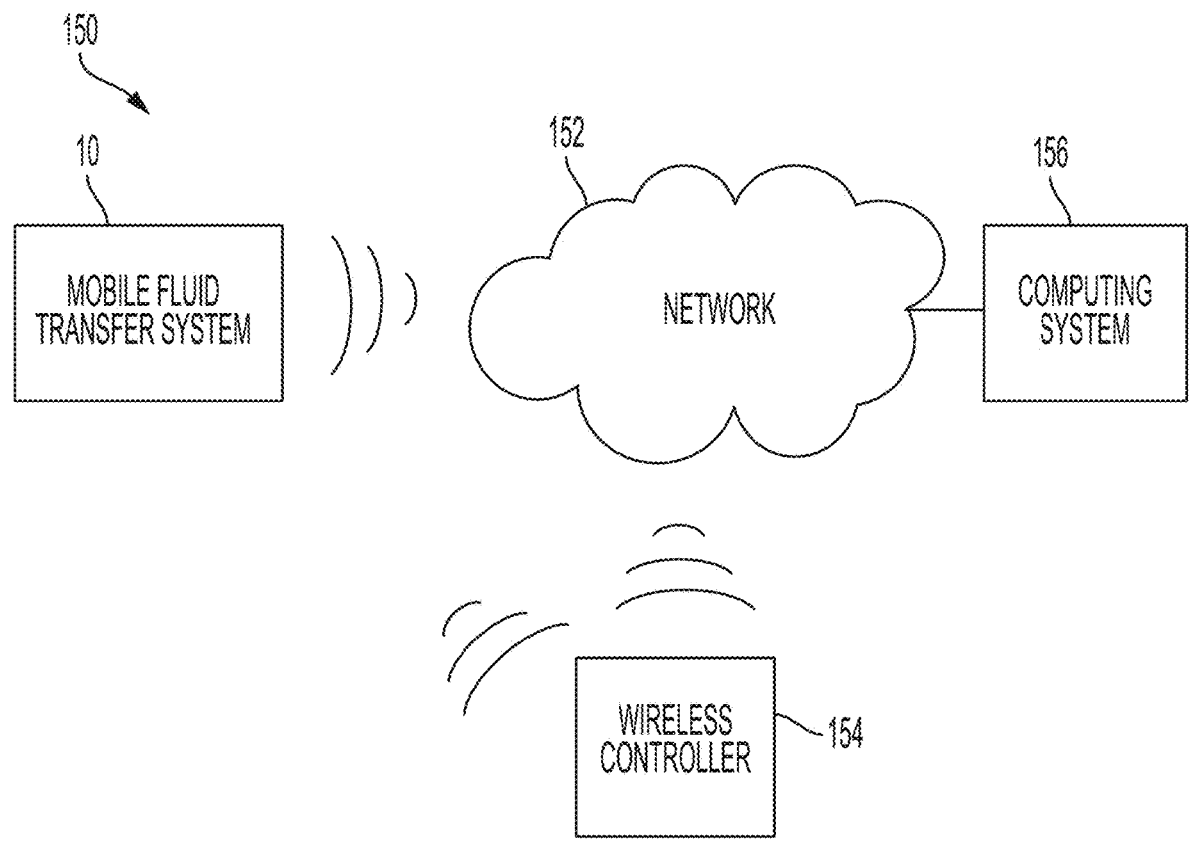
FIG. 11 illustrates a management system, in accordance with at least one aspect of the present disclosure.

FIG. 11 illustrates a management system 150, in accordance with at least one aspect of the present disclosure. The management system 150 includes the mobile fluid transfer system 10, a network 152, a wireless controller 154 and one or more computing systems 156. The mobile fluid transfer system 10 is communicably connected with the wireless controller 154 and the one or more computing systems 156 via the network 152. The network 152 may include any type of delivery system including, but not limited to, a local area network (e.g., Ethernet), a wide area network (e.g. the Internet and/or World Wide Web), a telephone network (e.g., analog, digital, wired, wireless, PSTN, ISDN, GSM, GPRS, and/or xDSL), a packet-switched network, a radio network, a television network, a cable network, a satellite network, and/or any other wired or wireless communications network configured to carry data. The network 152 may include elements, such as, for example, intermediate nodes, proxy servers, routers, switches, and adapters configured to direct and/or deliver data. In general, the mobile fluid transfer system 10 system 10 is configured to communicate with the wireless controller 154 and the one or more computing systems 156 via the network 14 using various communication protocols (e.g., HTTP, TCP/IP, TelNet, UDP, WAP, Web Sockets, WiFi, Bluetooth) and/or to operate within or in concert with one or more other communications systems. As the mobile fluid transfer system 10 can connect to the Internet, it will be appreciated that the mobile fluid transfer system 10 can have a distinct Internet Protocol address (IP address) which allows for host or network interface identification and location addressing.

The wireless controller 154 is configured to manage the operation of the mobile fluid transfer system 10, and may be any suitable type of handheld device such as, for example, a smartphone, a tablet, a laptop computing device and the like which can wirelessly communicate with the mobile fluid transfer system 10. According to various aspects, the wireless controller 154 is also configured to be connected directly to the control circuit 18 via a wired connection.

The one or more computing systems 156 can include, for example, a computing system of an owner of the mobile fluid transfer system 10, a computing system of a service provider associated with the mobile fluid transfer system 10, a computing system associated with an owner of the machine being serviced by the mobile fluid transfer system 10, etc., and each of these computing systems can be at locations which are remote from the machine being serviced.

According to various aspects, at least one of the one or more computing systems 156 can function as an inventory management system and/or a work order system. For example, as described above, the mobile fluid transfer system 10 can send information regarding fluid levels (as well as a lot of other information such as, for example, valve positions, fluid values, pump status, containment status, fluid temp, temperatures of heating elements, faults, etc.) to the computing system 156 so that the amount of fluid evacuated and the amount of fluid dispensed can be tracked in real-time or in near-real time. Stated differently, the computing system 156 knows the inventory of the fluids in the fluid storage containers 30, 50 at all times. According to various aspects, the information can be communicated to and from the wireless controller 154 once per second. Based on the information received by the computing system 156, and knowing the location of the mobile fluid transfer system 10, the computing system 156 can be configured to direct the mobile fluid transfer system 10 to the nearest location where the fluid/waste oil in the fluid storage container 30 can be safely and properly disposed and/or where additional fluid/new oil can be safely and properly added to the fluid storage tank 50. Additionally, based on all of the information sent by the mobile fluid transfer system 10 to the computing system 156, the computing system 156 can communicate information to a device associated with a driver of the vehicle which is transporting the mobile fluid transfer system 10. Such information can include, for example, a notification the fluid storage container 30 should be emptied, a notification the fluid storage container 50 should be refilled, a name, address, contact information and directions to the closest service provider where the fluid storage containers 30, 50 can be safely and properly emptied/filled (including how many miles away the service provider is from the current location of the mobile fluid transfer system 10), the price per gallon charged by the service, and the like.

According to various aspects, the wireless communication module 154 is configured to send data to computing system 156 via network 152 when proximity to a recognized beacon exceeds a pre-determined threshold. Beacons, which are small, wireless transmitters that use low-energy Bluetooth technology to send signals to other smart devices nearby, may be positioned at service locations visited by the mobile fluid transfer system 10, at evacuation/refill service centers visited by the mobile fluid transfer system 10, and at home bases of the mobile fluid transfer systems 10. Each beacon can be pre-configured with a unique identifier, the sensing of the beacon by the mobile fluid transfer system 10 can occur both when the mobile fluid transfer system 10 moves into and out of the beacon area. The sensing of the beacon triggers the control circuit 18 to switch to an internet accessible network connection. Once the internet accessible network connection is established, the mobile fluid transfer system 10 can send data to the computing system 156 via the wireless controller 154 and the network 152. The data sent may be data which has been collected and recorded since the last data send, and such data may include, for example, respective fluid levels of the fluid storage containers 30, 50, the location (e.g., latitude and longitude) where the service was performed, the date and time the service was performed, the amount of fluid evacuated from the machine and delivered into the fluid storage container 30, the amount of fluid delivered to the machine from the fluid storage container 50 and the like. According to other aspects, a cellular signal can be utilized at specific times to allow for the mobile fluid transfer system 10 to send the data to the computing system 156 via the network 152. Once the mobile fluid transfer system 10 is at a bulk oil center, the mobile fluid transfer system 10 can offload waste oil, upload new oil, and record both volumes, record event information, time information, date information, location information, technician information and the like for complete inventory control of fluids. According to various aspects, the mobile fluid transfer system 10 can connect to a computing system of a branch network (e.g., a branch network of the bulk oil center), in order to enable, regulate, control and/or capture and record fluid changes. Consumptions and volumes may be determined by measured changes in fluid levels from the start to the stop of a refill and/or evacuate event.

For organizations or companies which employ a plurality of mobile fluid transfer systems 10, each mobile fluid transfer system 10 can be communicating fluid levels in its fluid storage containers 30, 50, has recorded the amount of fluid delivered from the fluid storage container 50 to each serviced machine, and has recorded the amount of fluid evacuated from each serviced machine and delivered to the fluid storage container 30, the organization or company has nearly perfect visibility to assess, monitor, verify fluid inventories across all of its mobile fluid transfer systems 10. This can be done for branch locations as well as for facility-based locations.

According to various aspects, the computing system 156 can generate a work order for servicing any number of machines, and communicate the work order to a device associated with a driver of the vehicle which is transporting the mobile fluid transfer system 10. When generating the work order, the computing system 156 can take into account information such as, for example, the capacity of the fluid storage container 30, the capacity of the fluid storage container 50, the fluid capacity of each machine to be serviced (so as to know how much fluid will be evacuated from the machine into the fluid storage container 30 and how much fluid will be removed from the fluid storage container 50 to be added to the machine), the total gallons needed for all of the machines to be serviced, etc. For instances where the actual amount of the fluids in the fluid storage containers 30, 50 varies from the amounts indicated by the computing system 156, the mobile fluid transfer system 10 can be flagged for an audit and the computing system 156 can generate a discrepancy report based on the results of the audit.

For instances where the mobile fluid transfer system 10 is integrated to a network, jobs can be dispatched from a central location such that the technicians periodically receive work orders via the network. For a given work order, the work order may note total fluid volumes needed to complete the work. The computing system 156 may then compare the total volumes of fluids needed to the respective volumes present in the fluid storage containers 30, 50. If the respective volumes present in the fluid storage containers 30, 50 are sufficient to complete the work, the work order may note this. According to some aspects, if the respective volumes present in the fluid storage containers 30, 50 are not sufficient to complete the work, the computing system 156 will notify the wireless controller 154, or the technician, of the insufficiency. For such instances, the computing system 156 will present a map, or locations of the 'nearest' servicing locations, where the mobile fluid transfer system 10 can be serviced to offload fluid in the fluid storage container 30 and add new fluids to the fluid storage container 50 so as to be able to complete the work order.

At a given job site, once the control circuit 18 is communicably connected to the wireless controller 154, the wireless controller 154 may be viewed by the technician to see a representation of the volume of fluid in the fluid storage container 50, and the technician may request a volume of fluid be delivered from the fluid storage container 50 to the machine to be serviced. Either during or upon completion of the service, the mobile fluid transfer system 10 can record the GPS coordinates of service event, the gallons of fluid pumped from the fluid storage container 50, the work order number of the event, the machine serviced, the technician who oversaw the servicing, etc. On completion of the servicing, the changes in the volumes of the fluids in the fluid storage containers 30, 50 are recorded, and one or more of the following are logged: the volume of fluid delivered from the fluid storage container 50 to the machine, the time/date of the event, the location by GPS coordinates of the event, the fluids used for the servicing, and the volume of fluid evacuated from the machine and delivered into the fluid storage container 30.

According to various aspects, the mobile fluid transfer system 10 and the wireless controller 154 are integrated with the computing system 156. For such aspects, a mobile application such as, for example, the ConnexionMobile application may be utilized to link work orders to the amounts of fluids needed, the location of fill stations, inventory control upon entry into and/or exit from bulk stations, work order consumption data, and uploads to the computing system 156 whether the mobile fluid transfer system 10 is in or out of beacon range.

Although the above description is provided in the context of a single mobile fluid transfer system 10, it will be appreciated that any number of mobile fluid transfer systems 10 may be in communication with the computing system 156 via the network 152, any number of mobile fluid transfer systems 10 may be utilized to form a fleet of mobile fluid transfer systems 10, where the various mobile fluid transfer systems 10 can communicate with one another via the network 152 and can cooperate to complete any number of work orders.

Although the examples of the mobile fluid transfer system 10 described above address many of the concerns and shortcomings associated with certain lube skids, the illustrated and described examples of the mobile fluid transfer system 10 occupy a portion of the truck bed or the trailer which can be larger than desired by some service providers. According to various aspects, the components of the mobile fluid transfer system 10 can be arranged in a configuration other than as a lube skid which sets in a truck bed or on a trailer. For example, according to various aspects, one or more of the components of the mobile fluid transfer system 10 can be distributed within/integrated into the body of a vehicle (e.g., in front compartments, in side compartments, under floors, against roofs, etc.), thereby making more space available for carrying tools, parts, other equipment, etc.

Figure 12:
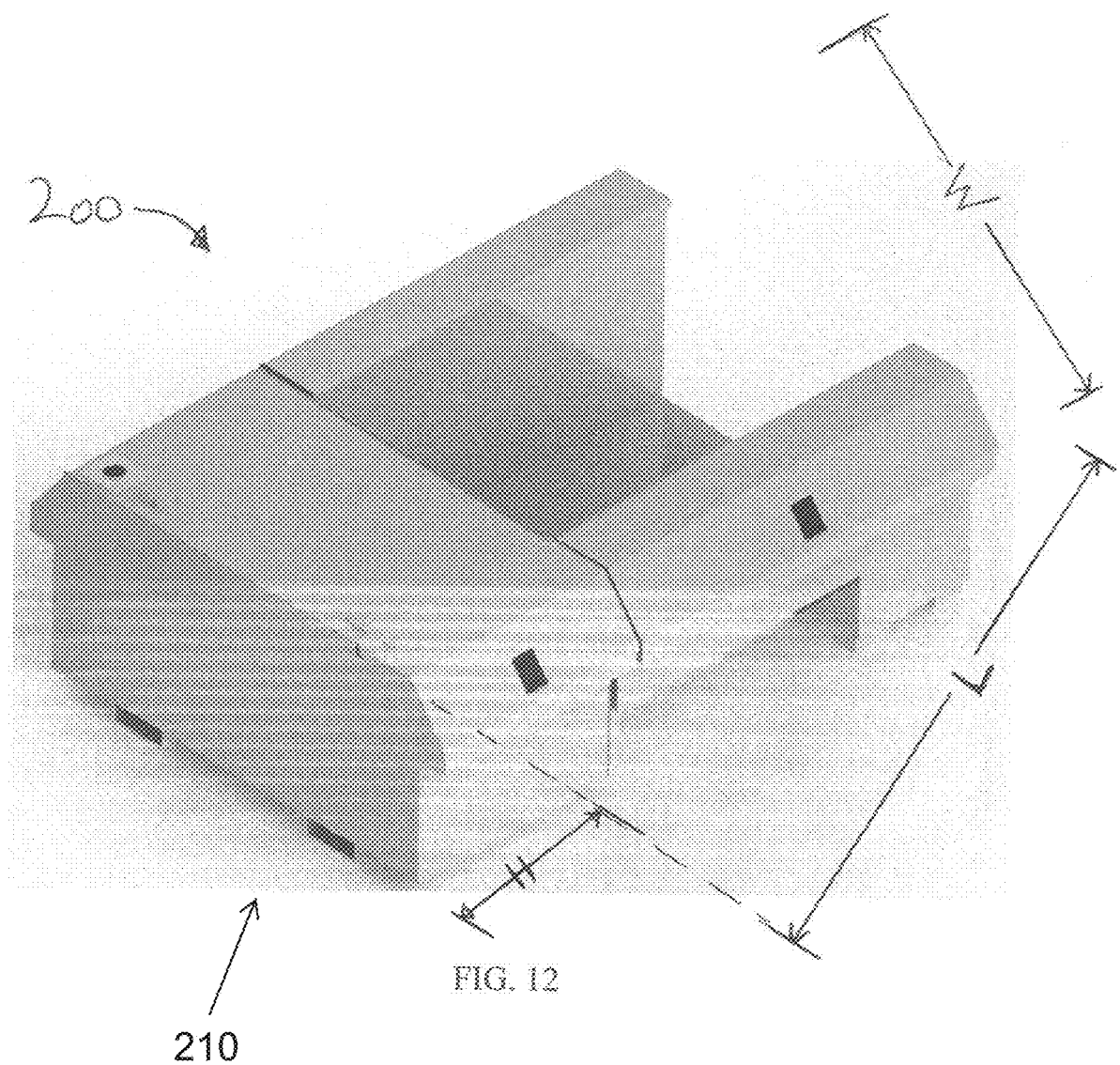
FIG. 12 illustrates a vehicle body having at least one component of a fluid transfer system integrated therein, in accordance with at least one aspect of the present disclosure.

FIG. 12 illustrates a vehicle body 200 having at least one component of a fluid transfer system 210 integrated therein, in accordance with at least one aspect of the present disclosure. Although no components of the fluid transfer system 210 are shown in FIG. 12 for purposes of simplicity, examples of such components are shown, for example, in FIGS. 13-17. The fluid transfer system 210 is similar to the mobile fluid transfer system 10 in that the fluid transfer system 210 can include all of the systems (e.g., fluid evacuation, fluid refill, sensing, fluid heating, purge, rollover protection, fluid containment, etc.), components (e.g., fluid storage containers, lines/piping, pumps, hoses, reels, etc.), controls and functionalities of the mobile fluid transfer system 10 described above. However, the fluid transfer system 210 is physically configured in a manner different from the mobile fluid transfer system 10. Stated differently, one or more of the components of the fluid transfer system 210 can be positioned/distributed relative to a vehicle in a manner (e.g. integrated into the vehicle body 200) which is different from the "lube skid" arrangement of the mobile fluid transfer system 10 as described above. Additionally, it will be appreciated that according to various aspects, the vehicle body 200 may have less than all of the systems, components, controls and functionalities of the fluid transfer system 210 integrated therein.

Figure 13:
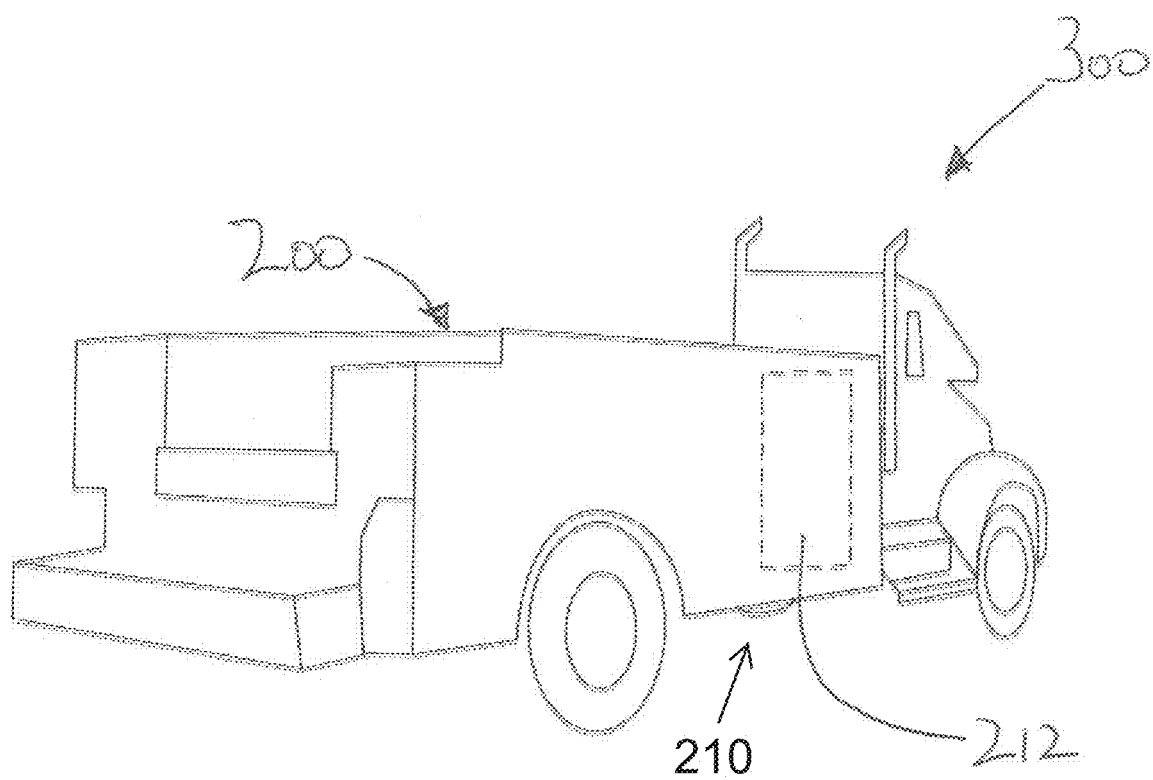
FIG. 13 illustrates a vehicle having the vehicle body of FIG. 12 mounted thereto, in accordance with at least one aspect of the present disclosure.

The vehicle body 200 shown in FIG. 12 is a U-shaped truck body having a width W, a length L and a height H, and which can be mounted to the frame of a truck (e.g., a Ford F-250, a Ford F-350, a Ford F-450, a Ford F-550 etc.) as shown in FIG. 13. The vehicle body 200 is similar to known U-shaped truck bodies in that the vehicle body 200 includes various storage cabinets for tools, parts, equipment, etc. However, the vehicle body 200 is different from known U-shaped truck bodies in that the vehicle body 200 includes at least one component (e.g., a fluid storage container) of the fluid transfer system 210 integrated therein. Of course, the vehicle body 200 may have any number of the components (fluid storage containers, pumps, reels, piping, etc.) of the fluid transfer system 210 integrated therein. Similarly, although the vehicle body 200 shown in FIG. 12 is an "open" U-shaped truck body, the vehicle body 200 may also be a "covered" U-shaped truck body, a "box truck" truck body, a flatbed, a van body as shown in FIG. 19, etc.

FIG. 13 illustrates a vehicle 300 having the vehicle body 200 mounted thereto, in accordance with at least one aspect of the present disclosure. For purposes of simplicity, the vehicle 300 is shown as a truck and the vehicle body 200 is shown as only having a single fluid storage container 212 of the fluid transfer system 200 integrated into a side compartment therein in a "vertical" orientation where the length and the height of the fluid storage container 212 are each greater than the width of the fluid storage container 212. However, it will be appreciated the vehicle 300 may be any type of vehicle (e.g. a truck, a van, a sport utility vehicle, etc.) and the vehicle body 200 may have any number of the components of the fluid transfer system 210 integrated therein, and such components may be integrated into areas other than one of the side compartments as shown, as well as oriented other than vertically. For example, according to various aspects, the fluid storage container 212 (or another fluid storage container of the fluid transfer system 210) may be integrated (1) beneath the upper surface of the floor of the vehicle body 200 in a "horizontal" configuration where the width and the length of the fluid storage container 212 are each greater than the height of the fluid storage container 212, or (2) at the "front" of the vehicle body 200 (against the cab of the vehicle 300) in a "horizontal" configuration where the width and the height of the fluid storage container 212 are each greater than the length of the fluid storage container 212. Additionally, one or more hose reels of the fluid storage system 210 may be integrated into a side compartment of the vehicle body 200 in a vertical orientation, beneath the upper surface of the floor of the vehicle body 200 in a horizontal orientation, etc. It will be appreciated that for components of the fluid transfer system 210 which are integrated into the vehicle body 200, the positioning of such components minimizes their exposure to weather, damage, etc.

Figure 14:
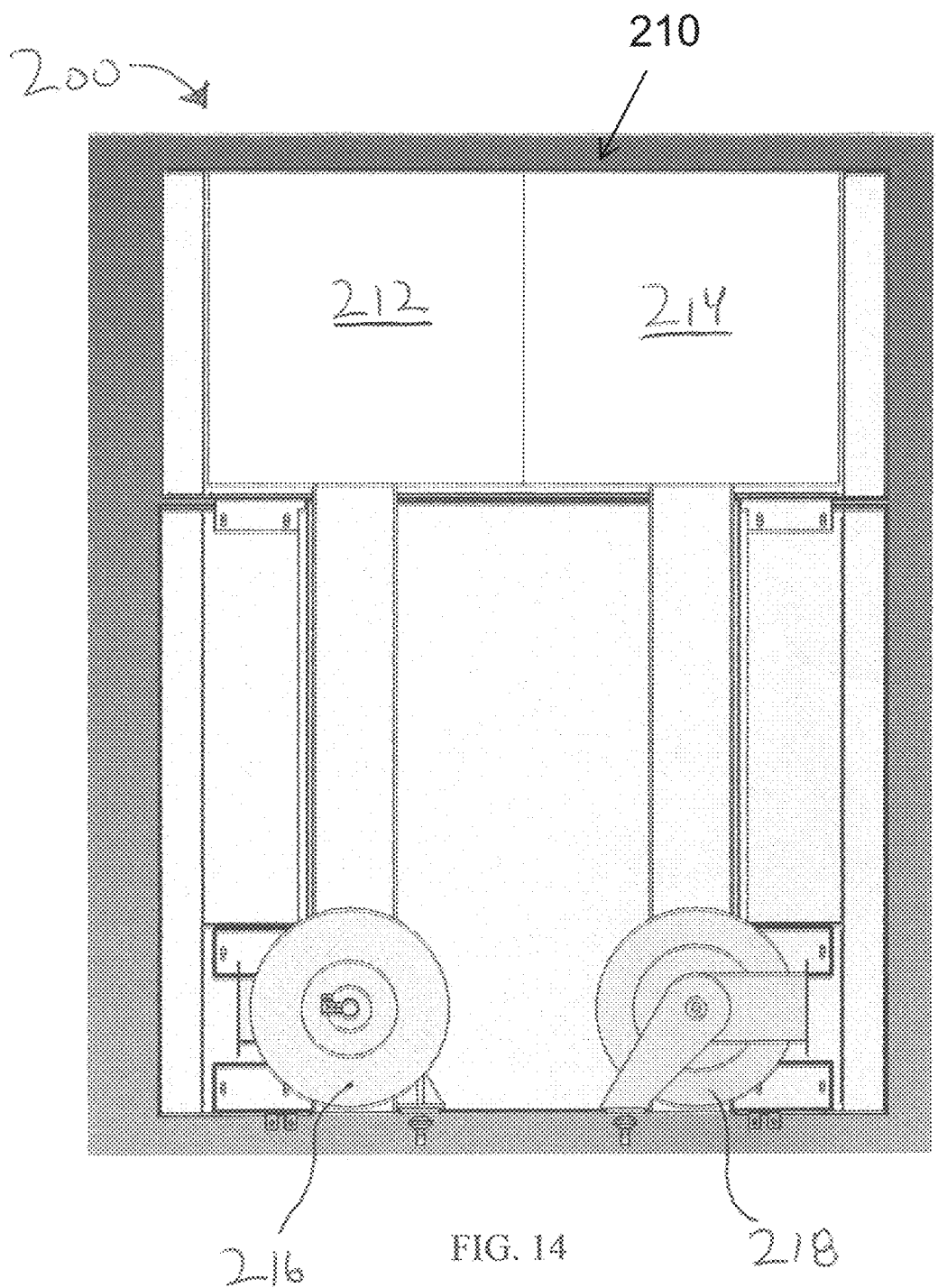
FIGS. 14-16 illustrate various views of the vehicle body of FIG. 12 having two different components of a fluid transfer system integrated therein, in accordance with at least one other aspect of the present disclosure.
Figure 15:
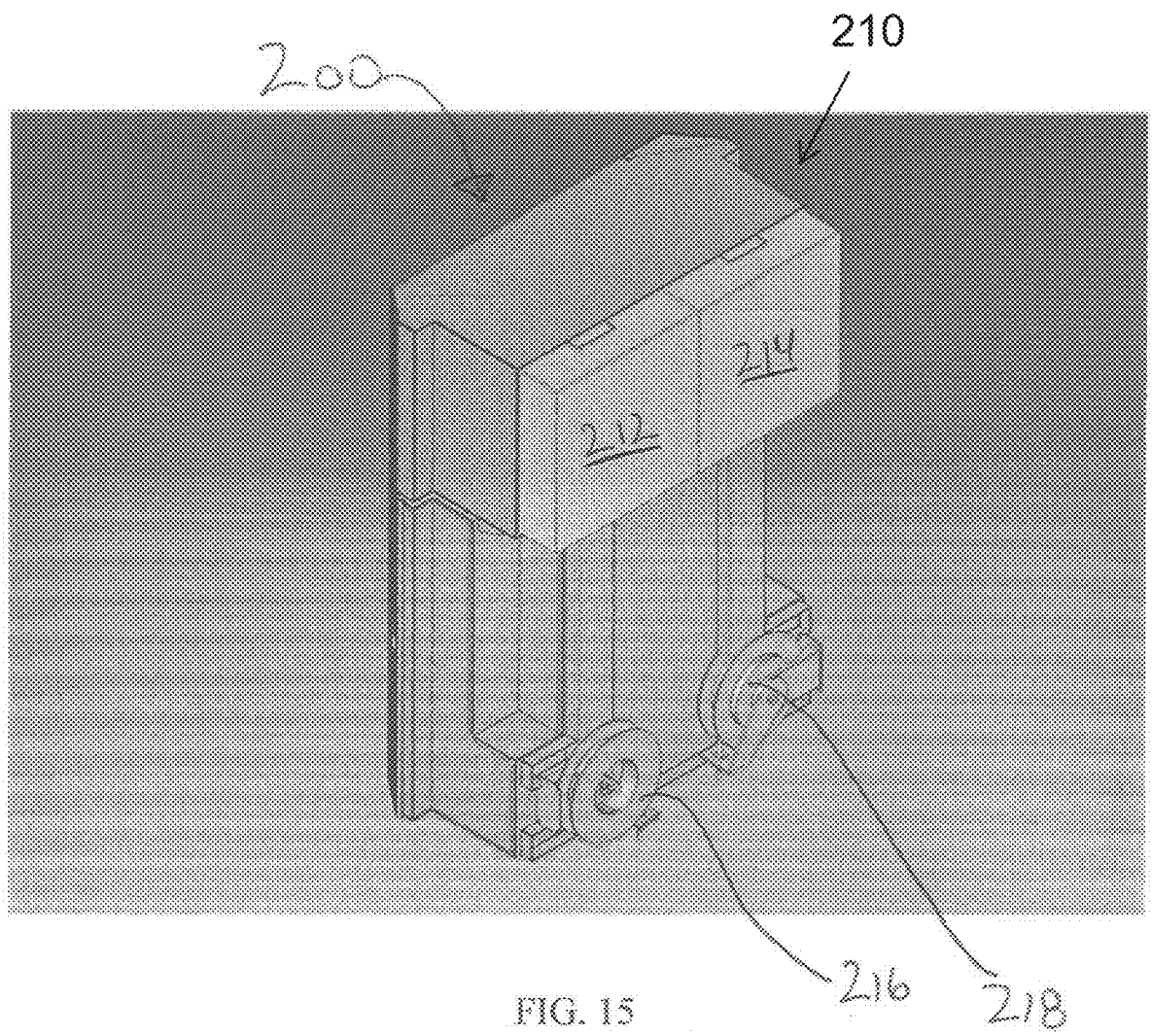
Figure 16:
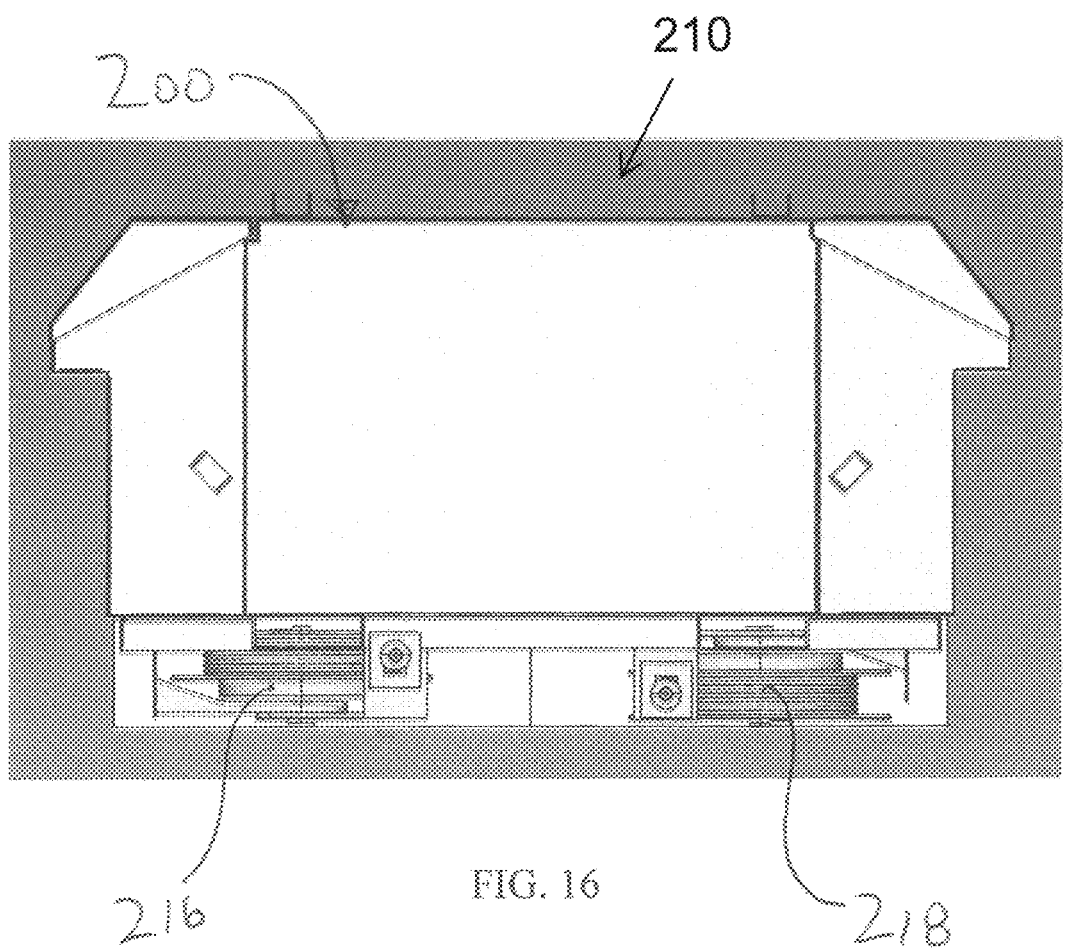

FIGS. 14-16 illustrate various views of the vehicle body 200 having two different components of the fluid transfer system 210 integrated therein, in accordance with at least one other aspect of the present disclosure. FIG. 14 may be considered a bottom view, FIG. 15 a bottom perspective view and FIG. 15 a front view of the vehicle body 200. For such aspects, the vehicle body 200 includes two fluid storage containers 212, 214 integrated into the "front" of the vehicle body 200 (against the cab of the vehicle 300 when mounted thereto) in a "horizontal" configuration where the width and the height of each of the fluid storage containers 212, 214 are each greater than the respective lengths of the fluid storage containers 212, 214. The vehicle storage body 200 of FIGS. 14-16 also includes hose reels 216, 218 integrated into the vehicle body 200 beneath the upper surface of the floor of the vehicle body 200 in a horizontal orientation where the diameter of the hose reels 216, 218 are oriented horizontally in a manner corresponding to the length and width of the vehicle body 200 (as opposed to being oriented vertically in a manner corresponding to the length and height of the lube skid of FIG. 1). When the hose reels 216, 218 are oriented horizontally beneath the upper surface of the floor of the vehicle body 200, the vertical footprints of the hose reels 216, 218 are flattened vertically, the space needed to mount the hose reels 216, 218 is minimized, and the ends, nozzles, etc. of the hoses (not shown) wound onto the hose reels 216, 218 can simply be pulled out from the rear of the vehicle body 200. According to other aspects, the hose reels 216, 218 can also be integrated into the vehicle body 200 in a horizontal configuration within any of the storage areas of the left side and/or the right side of the vehicle body 200. For such aspects, the ends, nozzles, etc. of the hoses (not shown) wound onto the hose reels 216, 218 can simply be pulled out from the left or right sides of the vehicle body 200.

Figure 17:
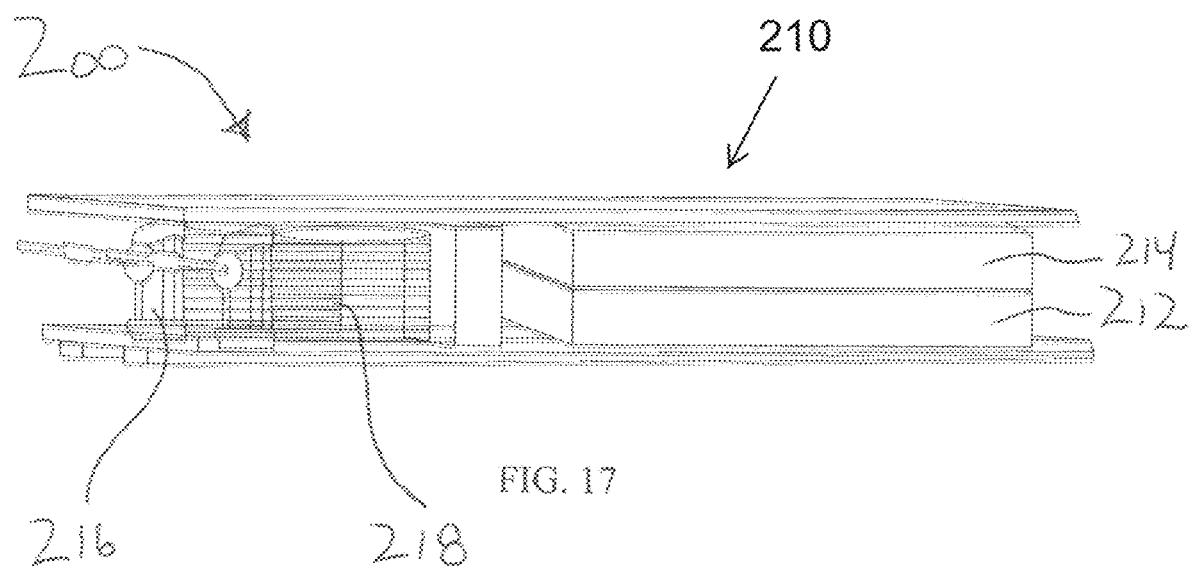
FIG. 17 illustrates a cross-section of a portion of the vehicle body 200, in accordance with at least one other aspect of the present disclosure.

FIG. 17 illustrates a cross-section of a portion of the vehicle body 200, in accordance with at least one other aspect of the present disclosure. The cross-section shows an area between an upper surface of the floor of the vehicle body 200 and a lower surface of the vehicle body 200. The vehicle body 200 shown in FIG. 17 includes two fluid storage containers 212, 214 and two hose reels 216, 218 integrated into this area of the vehicle body 200. The fluid storage containers 212, 214 are positioned proximate the "front" of the vehicle body 200 in a "horizontal" configuration where the width and the length of each of the fluid storage containers 212, 214 are each greater than the respective heights of the fluid storage containers 212, 214. The hose reels 216, 218 are positioned proximate the "rear" of the vehicle body 200 in a horizontal orientation where the diameter of the hose reels 216, 218 are oriented horizontally in a manner corresponding to the length and width of the vehicle body 200 (as opposed to being oriented vertically in a manner corresponding to the length and height of the lube skid of FIG. 1). Although only the fluid storage containers 212, 214 and the hose reels 216, 218 are shown and/or identified in FIG. 17, it will be appreciated that any number of components of the fluid transfer system 210 can be positioned in the area between an upper surface of the floor of the vehicle body 200 and a lower surface of the vehicle body 200. According to other aspects of the present disclosure, the fluid transfer system 210 may be separate from and configured to slide in to the vehicle body 200 in a low profile design. A rigid upper member may be provided to form as a load floor for the vehicle.

Figure 18:
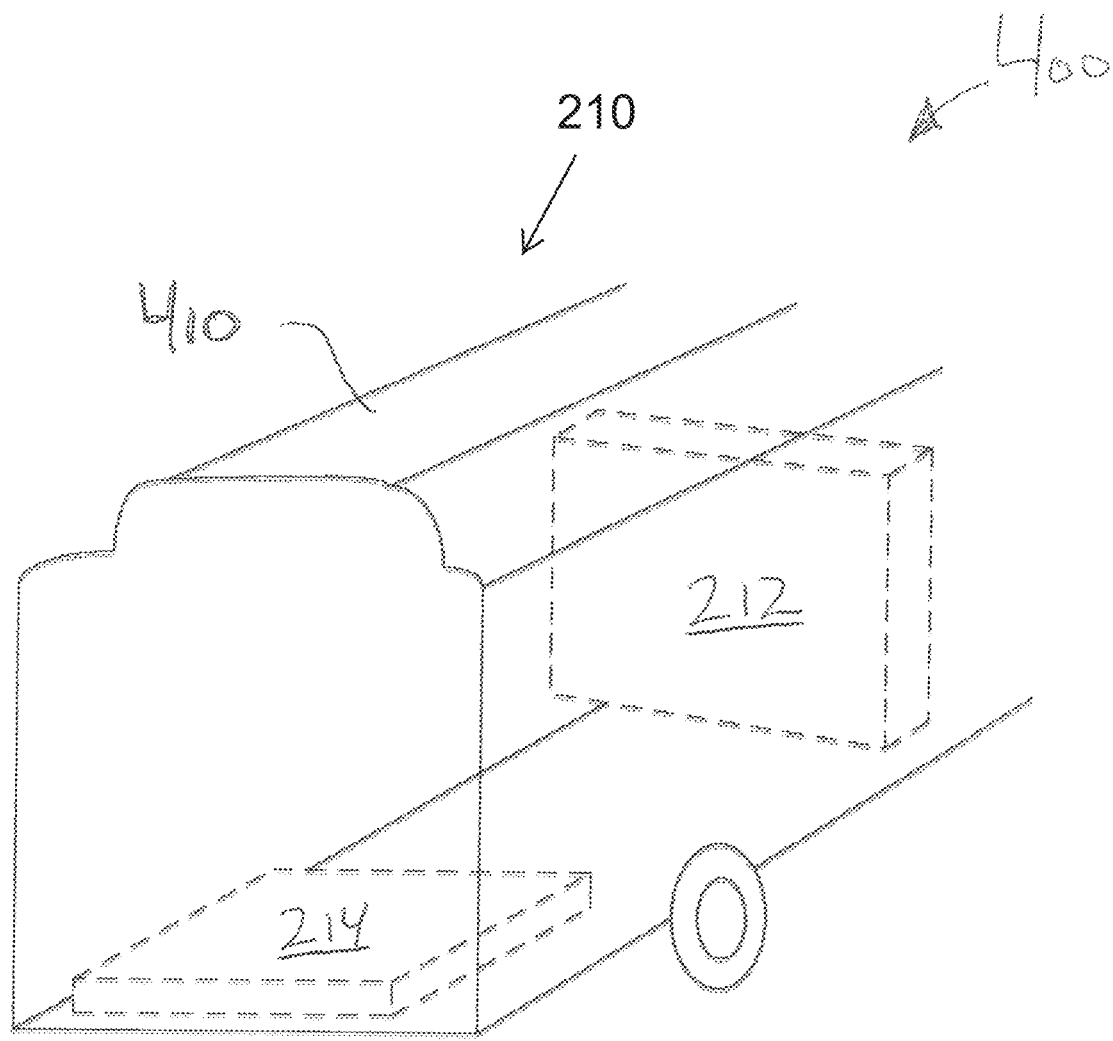
FIG. 18 illustrates another vehicle having another vehicle body mounted thereto, in accordance with at least one aspect of the present disclosure.

FIG. 18 illustrates another vehicle 400 having another vehicle body 410 mounted thereto, in accordance with at least one aspect of the present disclosure. For purpose of simplicity, only the rear portion of the vehicle 400 is shown. The vehicle 400 is shown as a van and the vehicle body 410 is shown as having the fluid storage container 212 of the fluid transfer system 200 integrated into a front portion of the vehicle body 410 and the fluid storage container 214 of the fluid transfer system 200 integrated into a bottom portion of the vehicle body 410. The fluid storage container 212 is integrated in a "vertical" orientation where the height and width of the fluid storage container 212 are each greater than the length of the fluid storage container 212. The fluid storage container 214 is integrated in a "horizontal" orientation where the width and length of the fluid storage container 214 are each greater than the height of the fluid storage container 214. However, it will be appreciated the vehicle body 410 may have any number of the components of the fluid transfer system 210 integrated therein, and such components may be integrated into areas other than the front portion and/or the bottom portion of the vehicle body 410 as shown in FIG. 18.

Although various examples have been illustrated and described regarding the positioning of components of the fluid transfer system 210 within the vehicle body 200, 410, it will be appreciated the respective components of the fluid transfer system 210 may be positioned in many other arrangements/configurations within the vehicle body 200, 410.

Examples

Example 1—A vehicle body is provided. The vehicle body comprises a fluid transfer system integrated within the vehicle body. The fluid transfer system comprises a fluid evacuation system comprising a first fluid storage container, a fluid refill system comprising a second fluid storage container, a sensing system coupled to the fluid evacuation system and the fluid refill system, and a control circuit coupled to the sensing system, the fluid evacuation system and the fluid refill system, wherein the control circuit is configured to (1) determine an amount of a first fluid in the first fluid storage container based on a first signal from the sensing system and (2) determine an amount of a second fluid in the second fluid storage container based on a second signal from the sensing system.

Example 2—The vehicle body of Example 1, wherein the fluid transfer system further comprises a power source coupled to the control circuit.

Example 3—The vehicle body of Example 2, wherein the power source is further coupled to the sensing system.

Example 4—The vehicle body of Examples 1, 2 or 3, wherein the fluid evacuation system further includes a solenoid valve, wherein the solenoid valve is controlled by the control circuit based on a third signal from the sensing system.

Example 5—The vehicle body of Examples 1, 2, 3 or 4, wherein the fluid evacuation system further includes a pump.

Example 6—The vehicle body of Examples 1, 2, 3, 4 or 5, wherein the fluid refill system further includes a solenoid valve, wherein the solenoid valve is controlled by the control circuit based on a third signal from the sensing system.

Example 7—The vehicle body of Examples 1, 2, 3, 4, 5 or 6, wherein the fluid refill system further includes a pump, wherein the pump is controlled by the control circuit based on a third signal from the sensing system.

Example 8—The vehicle body of Examples 1, 2, 3, 4, 5, 6 or 7, wherein the fluid transfer system further comprises a rollover protection system, wherein the rollover protection system is configured to prevent fluid present in the first fluid storage container from exiting the first fluid storage container when the vehicle body is in a non-upright position.

Example 9—The vehicle body of Examples 1, 2, 3, 4, 5, 6, 7 or 8, wherein the sensing system is wirelessly coupled to at least one of the following: the fluid evacuation system, the fluid refill system, and the control circuit.

Example 10—The vehicle body of Examples 1, 2, 3, 4, 5, 6, 7, 8 or 9, wherein the sensing system comprises a first sensing device configured to measure a level of a fluid within the first fluid storage container and a second sensing device configured to measure a level of a fluid within the second fluid storage container.

Example 11—The vehicle body of Example 10, wherein at least one of the first and second sensing devices comprises one of the following: an ultrasonic device; a laser device, a radar device, a magnetorestrictive device, and a pressure transducer.

Example 12—The vehicle body of Examples 10 or 11, wherein the sensing system further comprises at least one of the following: a third sensing device configured to output a signal when a level of the fluid in the first fluid storage container reaches a predetermined threshold, and a fourth sensing device configured to output a signal when a level of the fluid in the second fluid storage container reaches a predetermined threshold.

Example 13—The vehicle body of Examples 10 or 11, wherein the sensing system comprises a third sensing device configured to measure an orientation of the fluid transfer system.

Example 14—The vehicle body of Examples 10 or 11, wherein the fluid transfer system further comprises a fluid containment system surrounding the first and second fluid storage containers, and wherein the sensing system further comprises a third sensing device configured to detect a presence of a fluid proximate a floor of the fluid containment system and external to the first and second fluid storage containers.

Example 15—The vehicle body of Examples 10 or 11, wherein the sensing system further comprises at least one of the following: a third sensing device configured to measure a temperature of the fluid in the first fluid storage container, and a fourth sensing device configured to measure a temperature of the fluid in the second fluid storage container.

Example 16—The vehicle body of Examples 10, 11, 12, 13, 14 or 15, wherein the sensing system further comprises one or more additional sensing devices configured to measure a parameter associated with fluid transported by the fluid evacuation system.

Example 17—The vehicle body of Examples 1, 2, 3, 4, 5, 6, 7, 8, 9, 10, 11, 12, 13, 14, 15 or 16, further comprising a fluid heating system coupled to the control circuit, wherein the fluid heating system comprises a first heating device positioned in the first fluid storage container and a second heating device positioned in the second fluid storage container.

Example 18—The vehicle body of Examples 1, 2, 3, 4, 5, 6, 7, 8, 9, 10, 11, 12, 13, 14, 15, 16 or 17, further comprising a purge system comprising a source of a pressurized purging agent.

Example 19—The vehicle body of Example 18, wherein the purge system is coupled to the control circuit.

Example 20—The vehicle body of Examples 1, 2, 3, 4, 5, 6, 7, 8, 9, 10, 11, 12, 13, 14, 15, 16, 17, 18 or 19, wherein the control circuit comprises a processing circuit, a memory circuit coupled to the processing circuit, and a wireless communication module coupled to the processing circuit.

Although the various aspects of the vehicle body 200, 410 and the integrated fluid transfer system 210 have been described herein in connection with certain disclosed aspects, many modifications and variations to those aspects may be implemented. Also, where materials are disclosed for certain components, other materials may be used. Furthermore, according to various aspects, a single component may be replaced by multiple components, and multiple components may be replaced by a single component, to perform a given function or functions. The foregoing description and the appended claims are intended to cover all such modifications and variations as falling within the scope of the disclosed aspects.

While this invention has been described as having exemplary designs, the described invention may be further modified within the spirit and scope of the disclosure. This application is therefore intended to cover any variations, uses, or adaptations of the invention using its general principles. For example, although the invention was described in the context of a fluid transfer system integrated into a vehicle body, the general principles of the invention are equally applicable to other types of fluid transfer systems.

Any patent, patent application, publication, or other disclosure material, in whole or in part, that is said to be incorporated by reference herein is incorporated herein only to the extent that the incorporated materials does not conflict with existing definitions, statements, or other disclosure material set forth in this disclosure. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein will only be incorporated to the extent that no conflict arises between that incorporated material and the existing disclosure material.

What is claimed is:

1. A system, comprising:
   a fluid transfer system integrated within a vehicle body of a vehicle, wherein the fluid transfer system comprises:
   a fluid transfer system comprising a first fluid storage container;
   a fluid refill system comprising a second fluid storage container;
   a sensing system coupled to the fluid transfer system and the fluid refill system;
   a control circuit coupled to the sensing system, the fluid transfer system and the fluid refill system, wherein the control circuit is configured to:
   determine an amount of a first fluid in the first fluid storage container based on a first signal from the sensing system; and
   determine an amount of a second fluid in the second fluid storage container based on a second signal from the sensing system; and
   a computing system communicatively coupled to the control circuit, wherein the computing system is configured to receive information associated with the fluid transfer system from the control circuit and direct the vehicle to a fluid service location based on the information associated with the fluid transfer system.

2. The system of claim 1, wherein the fluid transfer system further includes a solenoid valve, wherein the solenoid valve is controlled by the control circuit based on a third signal from the sensing system.

3. The system of claim 1, wherein the fluid refill system further includes a solenoid valve, wherein the solenoid valve is controlled by the control circuit based on a third signal from the sensing system.

4. The system of claim 1, wherein the fluid refill system further includes a pump, wherein the pump is controlled by the control circuit based on a third signal from the sensing system.

5. The system of claim 1, wherein the fluid transfer system further comprises a rollover protection system, wherein the rollover protection system is configured to prevent fluid present in the first fluid storage container from exiting the first fluid storage container when the vehicle body is in a non-upright position.

6. The system of claim 1, wherein the sensing system is wirelessly coupled to at least one of the following:
   the fluid transfer system;
   the fluid refill system; and
   the control circuit.

7. The system of claim 1, further comprising a fluid heating system coupled to the control circuit, wherein the fluid heating system comprises:
   a first heating device positioned in the first fluid storage container; and
   a second heating device positioned in the second fluid storage container.

8. The system of claim 1, wherein the control circuit comprises:
   a processing circuit;
   a memory circuit coupled to the processing circuit; and
   a wireless communication module coupled to the processing circuit.

9. The system of claim 1, wherein the computing system is remotely located relative to the fluid transfer system.

10. The system of claim 1, wherein the computing system is configured to function as an inventory management system.

11. The system of claim 1, wherein the computing system is configured to function as a work order system.

12. The system of claim 1, wherein the transmitted information comprises a valve position, a fluid value, a pump status, a containment status, a fluid temperature, or a temperature, or combinations thereof.

13. The system of claim 1, wherein the information associated with the fluid transfer system comprises the amount of first fluid in the first fluid storage container or the amount of second fluid in the second fluid storage container.

14. The system of claim 1, wherein the information associated with the fluid transfer system comprises a location of the vehicle.

15. The system of claim 1, wherein the fluid service location comprises a location where the first fluid storage container and the second fluid storage container can be emptied.

16. The system of claim 1, wherein the fluid service location comprises a location where the first fluid storage container and the second fluid storage container can be filled.

17. The system of claim 1, wherein the fluid transfer system further comprises a power source coupled to the control circuit.

18. The system of claim 17, wherein the power source is further coupled to the sensing system.

19. The system of claim 1, wherein the fluid transfer system further includes a pump.

20. The system of claim 19, wherein the pump is configured to receive power from a battery of the vehicle.

21. The system of claim 1, further comprising a purge system comprising a source of a pressurized purging agent.

22. The system of claim 21, wherein the purge system is coupled to the control circuit.

23. The system of claim 1, wherein the control circuit is further configured to transmit a location of the fluid transfer system to the computing system.

24. The system of claim 23, wherein the computing system is further configured to transmit a location associated with fluid levels determined by the control circuit to the computing system.

25. The system of claim 24, wherein the location comprises a location where fluid can be disposed from the first fluid storage container.

26. The system of claim 24, wherein the location comprises a location where fluid can be added to the second fluid storage container.

27. The system of claim 1, wherein the sensing system comprises:
   a first sensing device configured to measure a level of a fluid within the first fluid storage container; and
   a second sensing device configured to measure a level of a fluid within the second fluid storage container.

28. The system of claim 27, wherein at least one of the first and second sensing devices comprises one of the following:
   an ultrasonic device;
   a laser device;
   a radar device;
   a magnetorestrictive device; and
   a pressure transducer.

29. The system of claim 27, wherein the sensing system further comprises at least one of the following:
- a third sensing device configured to output a signal when a level of the fluid in the first fluid storage container reaches a predetermined threshold; and
- a fourth sensing device configured to output a signal when a level of the fluid in the second fluid storage container reaches a predetermined threshold.

30. The system of claim 27, wherein the sensing system comprises a third sensing device configured to measure an orientation of the fluid transfer system.

31. The system of claim 27, wherein:
- the fluid transfer system further comprises a fluid containment system surrounding the first and second fluid storage containers; and
- the sensing system further comprises a third sensing device configured to detect a presence of a fluid proximate a floor of the fluid containment system and external to the first and second fluid storage containers.

32. The system of claim 27, wherein the sensing system further comprises at least one of the following:
- a third sensing device configured to measure a temperature of the fluid in the first fluid storage container; and
- a fourth sensing device configured to measure a temperature of the fluid in the second fluid storage container.

33. The system of claim 27, wherein the sensing system further comprises one or more additional sensing devices configured to measure a parameter associated with fluid transported by the fluid transfer system.

34. A vehicle body for use with a vehicle, comprising:
a fluid transfer system integrated within the vehicle body, wherein the fluid transfer system comprises:
- a first fluid storage container;
- a second fluid storage container;
- a pump configured to receive power from a battery of the vehicle;
- a sensing system coupled to the fluid transfer system and the fluid refill system;
- a control circuit coupled to the sensing system, the fluid transfer system and the fluid refill system, wherein the control circuit is configured to:
  - determine an amount of a first fluid in the first fluid storage container based on a first signal from the sensing system; and
  - determine an amount of a second fluid in the second fluid storage container based on a second signal from the sensing system; and
- a computing system communicatively coupled to the control circuit, wherein the computing system is configured to receive information associated with the fluid transfer system from the control circuit and communicate information to a driver of the vehicle based on the information associated with the fluid transfer system.

35. The system of claim 34, wherein the computing system is further configured to generate a work order based on the information associated with the fluid transfer system, and wherein the information communicated to the driver of the vehicle comprises the work order.

* * * * *